US007186180B2

(12) United States Patent
Lathrop et al.

(10) Patent No.: US 7,186,180 B2
(45) Date of Patent: Mar. 6, 2007

(54) LOTTERY GAME WITH METHOD FOR PLAYING A LOTTERY GAME USING MULTIPLE INDEPENDENT LOTTERY RESULTS

(75) Inventors: Kenneth Lathrop, Kinnelon, NJ (US); Stephen Penrice, Morristown, NJ (US)

(73) Assignee: Scientific Games Royalty Corporation, Newark, DE (US)

( * ) Notice: Subject to any disclaimer, the term of this patent is extended or adjusted under 35 U.S.C. 154(b) by 386 days.

(21) Appl. No.: 10/668,891

(22) Filed: Sep. 23, 2003
(Under 37 CFR 1.47)

(65) Prior Publication Data

US 2005/0064931 A1 Mar. 24, 2005

(51) Int. Cl.
*G06F 17/00* (2006.01)
*G06F 19/00* (2006.01)

(52) U.S. Cl. .......................................... 463/17; 463/19

(58) Field of Classification Search ............ 379/93.13; 463/17, 283, 1; 273/139; 283/72
See application file for complete search history.

(56) References Cited

U.S. PATENT DOCUMENTS 4,273,335 A * 6/1981 Allonsius ................ 273/144 B
5,106,089 A * 4/1992 Wood ......................... 273/139
5,112,050 A * 5/1992 Koza et al. .................... 463/17
5,116,049 A * 5/1992 Sludikoff et al. ........... 273/139
5,186,463 A * 2/1993 Marin et al. .................. 463/27
5,232,221 A * 8/1993 Sludikoff et al. ........... 273/139
5,273,281 A * 12/1993 Lovell ..................... 273/138.1
5,851,010 A * 12/1998 Feinberg ..................... 273/274
6,406,019 B1 * 6/2002 Joyner et al. ............ 273/138.1
6,416,408 B2 * 7/2002 Tracy et al. .................. 463/16
6,592,454 B2 * 7/2003 Libby et al. .................... 463/6
6,702,668 B2 * 3/2004 Banyai ........................ 463/17
6,783,456 B2 * 8/2004 White ......................... 463/18
6,830,514 B2 * 12/2004 Meyer et al. ................. 463/17
2003/0134672 A1 * 7/2003 Fulton ......................... 463/17
2004/0102239 A1 * 5/2004 Samila ........................ 463/17
2005/0003884 A1 * 1/2005 Meyer et al. ................. 463/17
2005/0064930 A1 * 3/2005 Jubinville et al. ............ 463/17
2005/0181858 A1 * 8/2005 Caro et al. .................... 463/17

OTHER PUBLICATIONS

John Scarne, Scarne's New Complete Guide To Gambling 1974, Simon and Schuster.*
Illinois State Lottery.*

* cited by examiner

*Primary Examiner*—Corbett B. Coburn
*Assistant Examiner*—Sunit Pandya
(74) *Attorney, Agent, or Firm*—Carlton Fields P.A.

(57) ABSTRACT

In one aspect, the invention is directed to a method for providing a lottery game for a plurality of players. The method may include accepting an entry from each of the plurality of players for an occurrence of the lottery game, and each entry may include a predetermined number of multi-digit entry numbers. The method may further include determining an outcome for the occurrence of the lottery game, and the outcome for the occurrence of the lottery game may include selecting a predetermined number of multi-digit drawing numbers. Still further, the method may include comparing the multi-digit entry numbers for each entry to the multi-digit drawing numbers for the occurrence of the lottery game, and determining whether each entry is a winning entry based on the level of correspondence between entry numbers and the drawing numbers.

31 Claims, 7 Drawing Sheets

LOTTERY GAME WITH METHOD FOR PLAYING A LOTTERY GAME USING MULTIPLE INDEPENDENT LOTTERY RESULTS

BACKGROUND

This invention relates to lottery systems for conducting lottery games and, more particularly, to a lottery game in which players either select or are assigned multiple numbers as a lottery entry that may compared to randomly selected numbers to determine whether a given entry may be a winning entry.

Various lottery systems incorporating methods for selecting entries for lottery players have been previously described. For example, U.S. Pat. No. 6,651,735 to Baba discloses a Keno playing machine comprising a selecting means for selecting a plurality of the Keno balls less than a set number out of the Keno balls displayed on a display screen in accordance with a player's operation. The Keno playing machine also includes an extracting means for extracting at random a required number of the Keno balls out of the Keno balls displayed on the display screen, and a counting means for comparing the extracted Keno balls to the selected Keno balls to count hit winning balls. Additionally, extracting means for additionally extracting a required number of the Keno balls out of the rest of the Keno balls except the extracted Keno balls when a number of the winning balls counted by the first counting means is above a set number. Further, the Keno playing machine includes a second counting means for comparing the additionally extracted Keno balls to the selected Keno balls to count a number of hit winning balls, and a paying means for paying odds based on a total of the number of the winning balls counted by the first counting means and the number of the additional winning balls counted by the second counting means, whereby addition of extra games can increase higher hit probabilities without changes to total hit probabilities.

SUMMARY OF THE INVENTION

In one aspect, the invention is directed to a method for providing a lottery game for a plurality of players. The method may include accepting an entry from each of the plurality of players for an occurrence of the lottery game, and each entry may include a predetermined number of multi-digit entry numbers. The method may further include determining an outcome for the occurrence of the lottery game, and the outcome for the occurrence of the lottery game may include selecting a predetermined number of multi-digit drawing numbers. Still further, the method may include comparing the multi-digit entry numbers for each entry to the multi-digit drawing numbers for the occurrence of the lottery game, and determining whether each entry is a winning entry based on the level of correspondence between entry numbers and the drawing numbers.

In another aspect, the invention is directed to a method for providing a lottery game for a plurality of players, including accepting an entry from each of the plurality of players for an occurrence of the lottery game, wherein each entry may include a first multi-digit entry number, a second multi-digit entry number, and a third multi-digit entry number. The method may further include determining an outcome for the occurrence of the lottery game. The outcome for the occurrence of the lottery game may include selecting a first multi-digit drawing number, selecting a second multi-digit drawing number, and selecting a third multi-digit drawing number wherein the number of digits in each multi-digit drawing number is equal to the number of digits in each multi-digit entry number. Still further, the method may include comparing the first multi-digit entry number to the first multi-digit drawing number, the second multi-digit entry number to the second multi-digit drawing number, and the third multi-digit entry number to the third multi-digit drawing number for the occurrence of the lottery game, and determining whether each entry is a winning entry based on the level of correspondence between the first multi-digit entry number and the first multi-digit drawing number, the second multi-digit entry number and the second multi-digit drawing number, and the third multi-digit entry number and the third multi-digit drawing number.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Lottery Network

Figure 1:
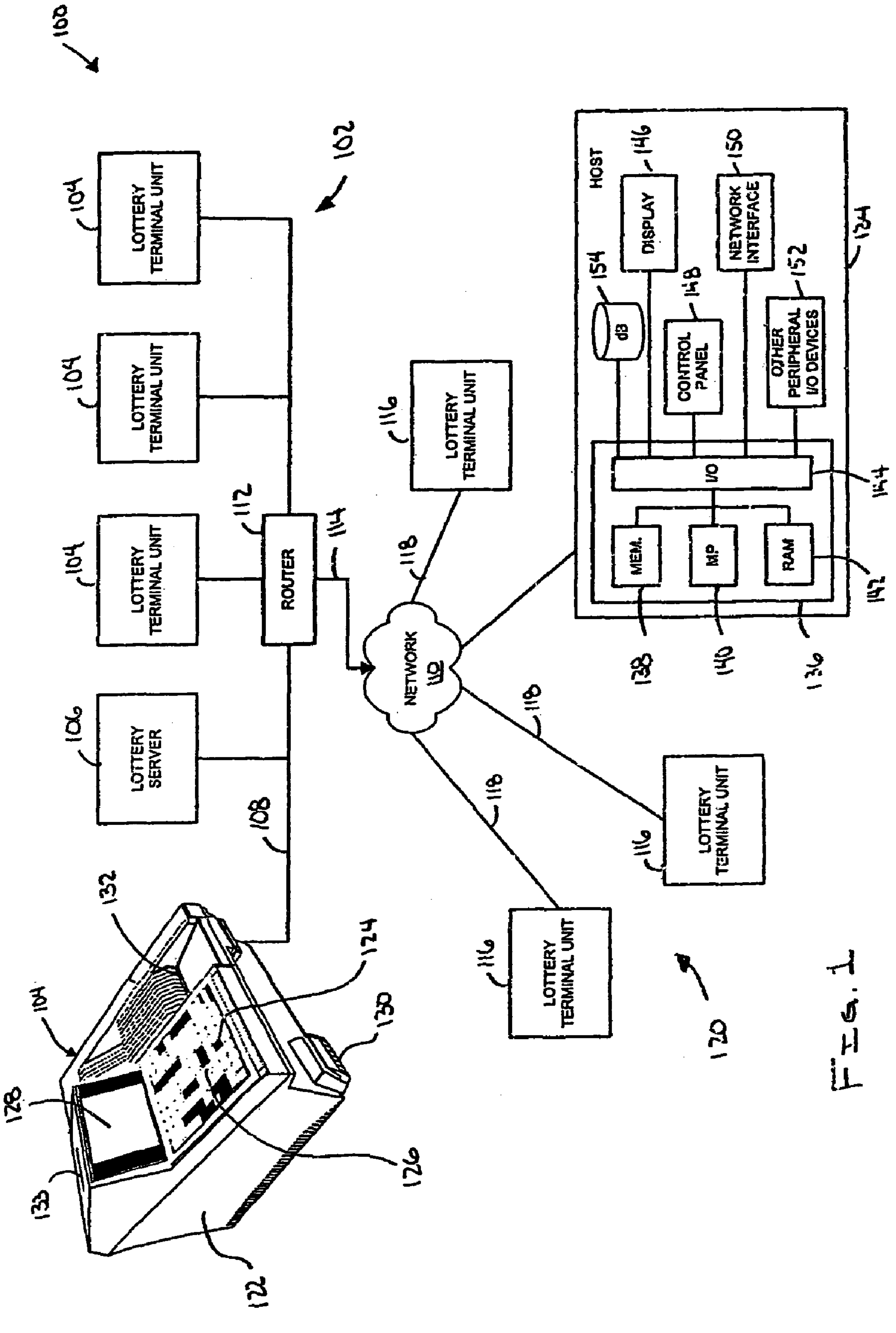
FIG. 1 is a block diagram of an embodiment of a networked lottery system.

FIG. 1 illustrates one possible embodiment of a lottery network 100 that may implement a multi-theme instant win game in conjunction with a lottery-type game. Referring to FIG. 1, the lottery network 100 may include a first group or network 102 of lottery terminal units 104 operatively coupled to a lottery network computer or server 106 via a network data link or bus 108. The lottery network 100 may be coupled to a network 110, which may be, for example, the Internet, a wide area network (WAN), or a local area network (LAN) through a network hub or router 112 via a first network link 114. In one possible configuration, the first network 102 may be a state lottery system operating within an individual state or region of states. In this configuration, the individual lottery terminal units 104 may be interconnected to a central system for tracking and coordination of the state lottery system, including issued tickets, drawn numbers, and/or amounts waged.

The lottery network 100 may further include other lottery terminal units 116 that may be directly connected to the network 110 through a plurality of direct network links 118, thereby eliminating the need for the bus 108, router 112 or other networking equipment. Each lottery terminal unit 116 in this configuration may represent a group of lottery retailers participating in the state lottery, as described above, or a plurality of the lottery terminal units 116 may be grouped together to form a lottery node 120. The lottery nodes 120, in turn, may be directly connected and/or multiplexed to the network 110 via the direct network links 118. Further, the direct network links 118 may represent secure communications channels physically hardened against tampering and/or the communications may be encrypted to prevent unauthorized access to information transmitted thereon.

FIG. 1 further illustrates a perspective view of one possible embodiment of a lottery terminal unit 104. Although the following description relates to the design of the lottery terminal unit 104 depicted in FIG. 1, it should be understood that the lottery terminal units 104 and 116 may include similar features or may be configured with functionality to allow the entry of the information required for a player to participate in a lottery game. The exemplary lottery terminal unit 104 may include a housing or casing 122, and one or more input and output devices, which may be, among other things, a control panel 124 having a plurality of input keys 126, a display 128, a value input device such as a card reader 130, a lottery play slip or ticket reader 132, and a lottery ticket printer 133. The lottery play slip reader 132 may be configured to read bar codes, user selections, magnetically stored information or any other desired input information or media used to encode information on a play slip or lottery ticket.

The input keys 126 may allow the player or sales agent to select the game to be played, input the value to be wagered, manually enter the selected lottery characters, and input any other information necessary to play a given lottery game. The display 128 may be a LCD, a CRT, a touch-screen capable of receiving and displaying information, or any other suitable device capable of displaying the information input via the input keys 126, the lottery play slip reader 132 or the touch-screen input. The value input device may include any device that can accept value or a wager from a customer, such as the card reader 130 or an optical currency collector. The value input device may further be integrated with external devices, such as cash registers or other retail terminals, communicatively connected to the lottery terminal unit 104, to exchange information necessary to receive and record the wagering transactions. The lottery ticket printer 133 may be used to print or otherwise encode lottery tickets with information selected or required to play a given lottery game. Further, the lottery ticket printer 133 may provide lottery tickets, or even completed lottery slips if the selections were generated automatically, that could be used by the player in other lottery terminal units 116 equipped with lottery play slip or ticker readers 132.

Moreover, the lottery terminal units 104, 116 and lottery nodes 120 may include centralized or shared display mechanisms such as a scrolling digital signs or messaged boards configured to display the outcome of a completed lottery game and advertises or attract players to upcoming games. In one exemplary configuration, at least one lottery terminal unit 104 or 116 includes software for generating graphics and is communicatively connected to an external LCD suitable for displaying graphics. Upon completion of a lottery drawing, the results or winning information can be formatted by the graphical software and displayed, in an eye-catching manner, on the external LCD. Alternatively, the graphical software may be stored on a peripheral device, such as a CD-ROM, and the result of the lottery drawing communicated thereto for formatting and display.

The network 110, and hence the individual lottery terminal units 104 and 116, may be communicatively connected to a central host computer 134. The central host computer 134 may be a single networked computer, or a series of interconnected computers having access to the network 110 via a gateway or other known networking system. Generally, the central host computer 134 may include a central lottery controller 136 configured to manage, execute and control the individual lottery elements 104, 116 and 120 and the routines used to play the various lottery games. The central lottery controller 136 may include a memory 138 for storing lottery programs and routines, a microprocessor 140 (MP) for executing the stored programs, a random access memory 142 (RAM) and an input/output bus 144 (I/O). The memory 138, microprocessor 140, RAM 142 and the I/O bus 144 may be multiplexed together via a common bus, as shown, or may each be directly connected via dedicated communications lines, depending on the needs of the lottery system 100.

Further, the central lottery controller 136 may be directly connected, hardwired, or indirectly connected through the I/O bus 144 to external components such as a display 146, a control panel 148, a network interface device 150 and other peripheral I/O devices 152. Examples of other peripherals device include, but are not limited to, storage devices, wireless adaptors, printers, and the like. In addition, a database 154 may be communicatively connected to the central lottery controller 136 and provide a data repository for the storage and correlation of information gathered from the individual lottery terminal units 104, 116 or lottery nodes 120. The information stored within the database 154 may be information relating to individual lottery terminal units 104, 116 such as terminal specific information like a terminal identification code, sales agent code, and location for each lottery ticket printed. The database 154 may further include ticket specific information such as the type of game played (Lotto, Pick-3, Pick-4 etc.), or game specific information such as the total lottery sales, drawing outcomes, amounts wagered, numbers selected by the players, and the like.

In operation, the central lottery controller 136 may operate as a clearing-house for the lottery terminal units 116 and the first lottery network 102, whereby the lottery network computer 106 collects, stores and analyzes status and operational information relating to each lottery terminal unit 104. For example, the lottery network computer 106 may continuously receive transactional data from the individual lottery terminal unit 104 indicative of the number of tickets sold and associated dollar amounts, and the lottery numbers and number order generated at each lottery terminal unit. The transactional data collected by the lottery network computer 106 may be communicated to the central host computer 134 continuously or may be processed into a batch format and transmitted periodically for storage in the database 154. If, for example, the central lottery controller 136 and the lottery network computer 106 are communicating continuously, it may be desirable for the central lottery controller 136 to execute the actual lottery routine and transmit the results to the lottery network computer 106 for distribution to the lottery terminal units 104 and directly to the lottery terminal units 116. In addition, it may be desirable for the central lottery controller 136 to include, via the peripheral device input 152, a scanner, such as the lottery play slip reader 132, for directly importing/reading manual selections into the database 154.

It will be understood that the lottery network 100 illustrated in FIG. 1 may alternatively represent the network layout within a gaming establishment providing a lottery-type game. In this alternate configuration, each stand-alone lottery terminal unit 104 may be an interactive player terminal capable of playing a variety of lottery or casino games, such as a lottery game, Keno, Bingo, video poker, video blackjack, slots, and the like. The lottery terminal units 104 may be distributed throughout a single gaming establishment or casino and connected with a LAN, or throughout multiple casino sites and connected with a WAN. Further, the LAN and/or WAN connecting each of the lottery terminal units 104 may include one or more separate and secure buses 108, routers 112, web servers, gateways and other networking equipment to provide continuous and/or redundant connectivity to the network 110. The network 110, configured in this manner, provides a system for players to collectively participate in a centralized lottery-type game. Further, the network 110 may include express gaming stations at which players may generate predefined or automatically selected lottery tickets simply by making a selection and a wager. As discussed above, the network 110 may be communicatively connected to the central host computer 134, the central lottery controller 136, and the database 142 to allow for implementation, storage, tracking and analysis of the lottery game.

The central host computer 134 may store the software for managing one or more lottery games offered in the lottery system 100. Some jurisdictions may limit the number of lottery games that may be offered by a lottery system. Consequently, once a lottery system offers the maximum number of lottery games allowed by the jurisdiction, it may be necessary to remove or otherwise decommission an existing lottery game in order to implement a new lottery game. Moreover, when a new game is implemented in the lottery system, it may be necessary to perform certification testing on the new lottery game to ensure compliance of the lottery game with the applicable gaming regulations. Therefore, it may be desirable to be able to reuse lottery game functionality in order to avoid certifying or recertifying lottery game software, and to conserve the limited number of available lottery game positions available in the lottery system.

Lottery Unit

Figure 2:
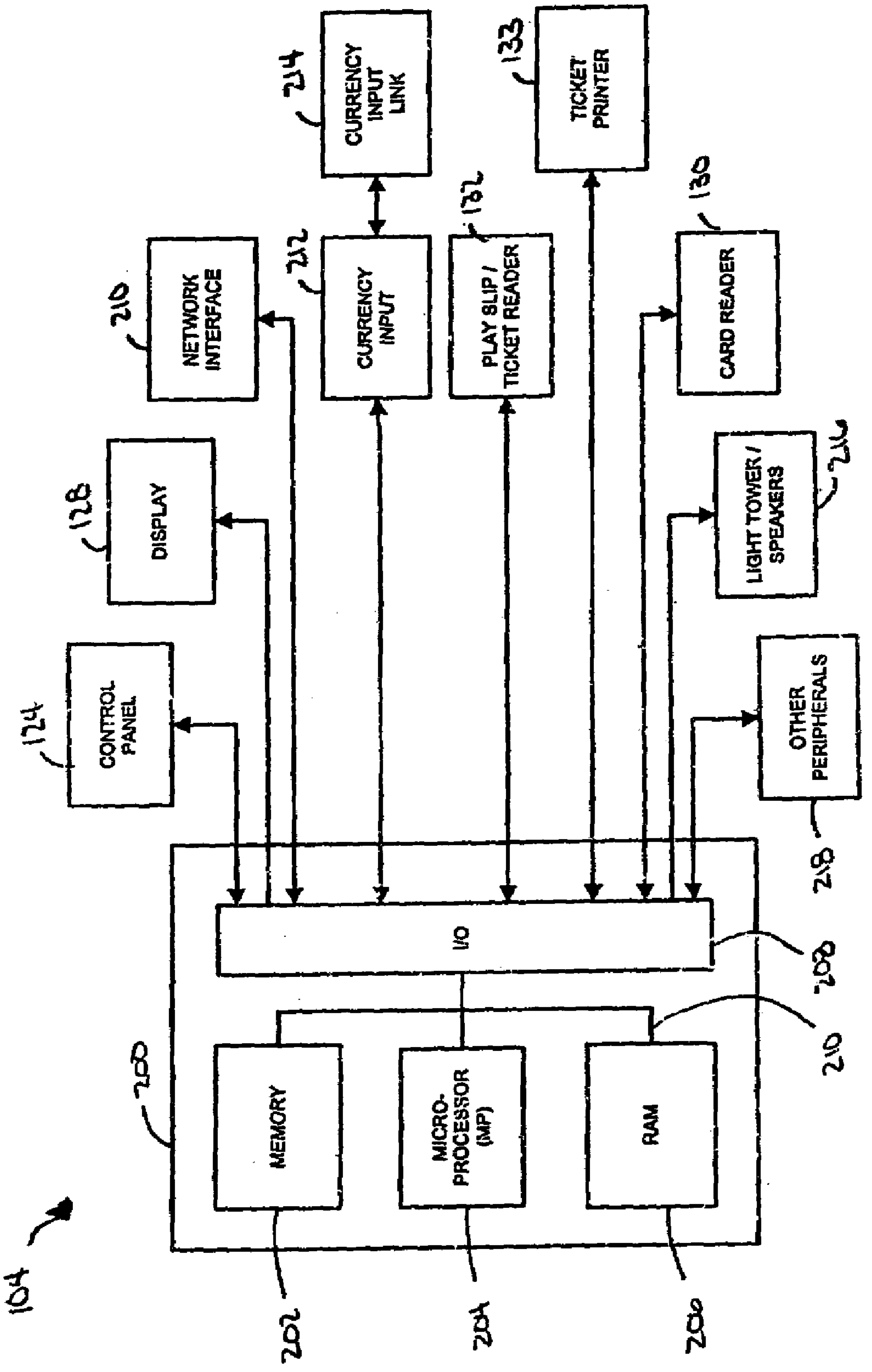
FIG. 2 is a block diagram of the electronic components of the lottery terminal unit shown in FIG. 1.

FIG. 2 illustrates a block diagram of an embodiment of the internal electronic components of the lottery terminal unit 104. The lottery terminal unit 116 may have the same or a different design, but may be configured to receive player entries into the lottery games and process winning lottery tickets. Referring to FIG. 2, the exemplary lottery terminal unit 104 may include a number of internal components such as a controller 200 having a program memory 202, a microcontroller or microprocessor (MP) 204, a random access memory (RAM) 206, and an input/output (I/O) bus 208, all of which may be interconnected via an address or data bus 210. It should be understood that while only one microprocessor 204 is shown herein, the controller 200 may be designed to support multiple microprocessors 204 arranged to operate in parallel or in any other known configuration. Similarly, the controller 200 may include multiple, and even redundant, program memories 202 and random access memories 206 to increase expandability, capacity and/or processing speed. The multiple processor and memory configurations may be used, for example, to isolate the individual lottery functions such as basic lottery operation, random number generation, information tracking, and the like. Although the I/O bus 208 is shown as a single addressable and integral block, it should be understood that direct I/O connections may be made, as well as any other desired I/O connection scheme. The program memory 202 and random access memory 206 may be implemented as a solid-state memory, an integrated circuit, a magnetically readable memory, and/or optically readable memories. Further, the program memory 202 may be read only memory (ROM) or may be read/write memory such as a hard disk. In the event that a hard disk is used as the program memory, the data bus 210 may comprise multiple address/data buses, which may be of differing types, and there may be a separate I/O circuit between the data buses.

FIG. 2 schematically illustrates that the controller 200 may be communicatively connected to the control panel 124, the display 128, the card reader 130, the lottery play slip or ticket reader 132 and the lottery ticket printer 133. The controller 200 may further be communicatively connected to a network interface card (NIC) or device 210, a currency input device 212 including a currency input link 214, and a light and speaker link 216. The network interface card 210 may be configured to allow the lottery terminal unit 104 to communicate information with other networked devices similarly connected to the network 110 using any know protocol or standard suitable for a lottery or network application. The currency input device 212 may be any kind of value input device discussed above, or may include a currency input link 214 communicatively connected to a cash register (not shown) or other device for tracking and/or totaling currency or transactions. The light and speaker link 214 may be used to integrate visual and/or audio displays into the design of the lottery terminal unit 104.

FIG. 2 illustrates the components 124, 128–132, and 210–218 directly connected the I/O bus 208 via dedicated circuits or conductors. However, it will be understood that different connections schemes may be used. For example, some of the components requiring limited communications with the controller 200 may be communicate via an auxiliary I/O bus (not shown) in a scheduled manner, while other components requiring fast communications or large data transfers may be directly connected to the I/O bus 208. Furthermore, depending on the needs of the system, some of the components may be directly connected to the microprocessor 184 without having to pass through the I/O bus 208.

Lottery Play Slips and Tickets

Regardless of the configuration or layout of the lottery system 100, it may often be the case that the lottery terminal unit 104, 116 will include lottery play slip or ticket readers 132 which may be used to scan an instant game ticket or a lottery play slip 300 (FIG. 3), which may, for example, be a play slip for a Keno game, completed by the player, and a lottery ticket 302 (FIG. 4), which may be, for example, a Keno game lottery ticket, previously generated at a lottery ticket printer 133, to determine whether the ticket contains a winning combination. The lottery play slip 300 and the lottery ticket 302 may be composed of paper, Mylar, cardboard or any other suitable printable or encodable material. The lottery play slip 300 and ticket 302 may include informational, instructional or security information such as a bar code, award details, authentication numbers, or any other desired information. Further, it will be understood that different ticket types and formats may be used depending on the theme, format and rules of the game. The lottery ticket 302 may be printed with any optically readable material such as ink, or encoded with data on a magnetic material, smart chip or other media for encoding data.

Figure 3:
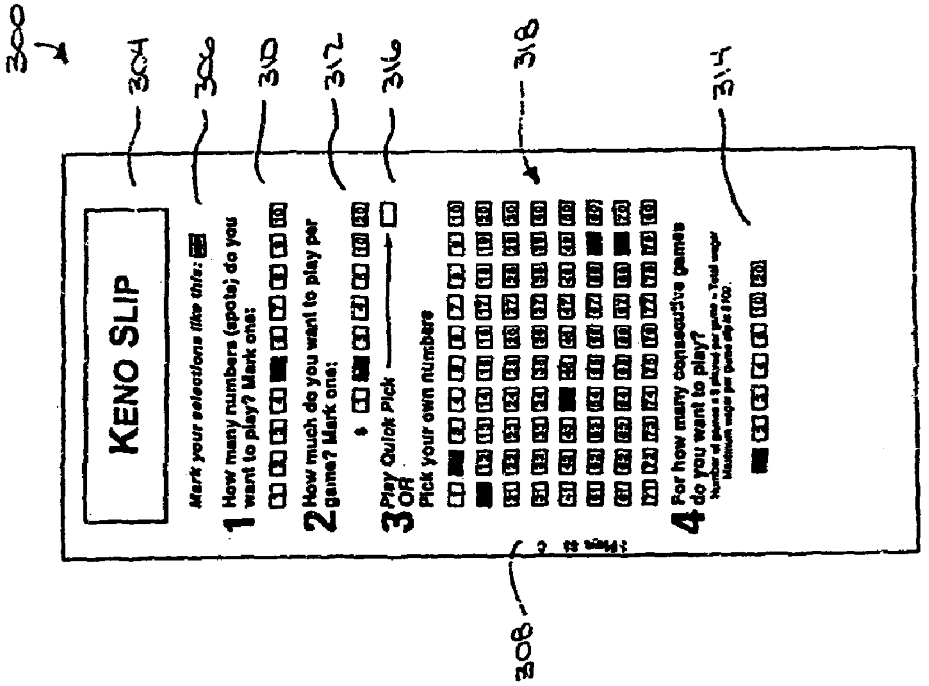
FIG. 3 illustrates an embodiment of a lottery play slip that may be read by the lottery terminal unit of FIG. 2.

Referring to FIG. 3, the lottery play slip 300 can be configured and arranged in any number of variations for use in lottery games such as Keno, Lotto, Powerball-style games, Pick-3 and Pick-4 games, and the like, but may typically include a number of common indicia or information. For example, the exemplary Keno play slip 300 may include a title 304 indicative of the associated game, a set of directions or instructions 306, and a plurality of game specific selections, as generally indicated by the numeral 308. The game specific selections may allow the player to define how many numbers or characters associated with the lottery game to play 310, the exact amount to be wagered 312, and the number of games or drawings to be entered 314. Further, the lottery play slip 300 may be arranged with indicia 316 to allow a player to play the lottery game with Quick Pick selections (i.e. selections automatically and randomly determined by one of the lottery terminal units 104, 116 or the central lottery controller 136), and/or with manual selection indicia 318 arranged to allow the player to select the player's entry from a predefined list of numbers, letters or characters associated with the lottery game. In this manner, the player or a sales agent can fill-out, code or otherwise record the information necessary to participate in a specific lottery game, and provide that information to a central collection point, such as the lottery terminal unit 104, 116 or the central host computer 136 for processing and/or recordation. The reverse side of the play slip 300 may also have indicia (not shown) thereon with information relating the lottery game, such as instructions on how to play the game, win and claim prizes, schedules or tables of prize amounts and odds of winning, requirements for playing or filling out play slips, lottery disclaimers, and the like.

The exemplary lottery play slip 300 illustrated in FIG. 3 is configured to allow the player to make entry in a Keno game. The player may select how many numbers or spots are to be matched in a given Keno game at 310, thereby decreasing the odds of winning and simultaneously increasing the potential payout of a winning selection. By selecting a Quick Pick at area 316, the player may allow the lottery terminal unit 104 to randomly select a plurality of numbers equal to the number of spots indicated at 310. However, the player may opt to manually select the numbers by choosing numbers, or spots, between 1 and 80, as indicated in the manual selection area 318. Finally, the manual or automatic selections may be consecutively played by indicating the desired number of games, for example one, two, three, four, five, ten or twenty, at area 314.

Figure 4:
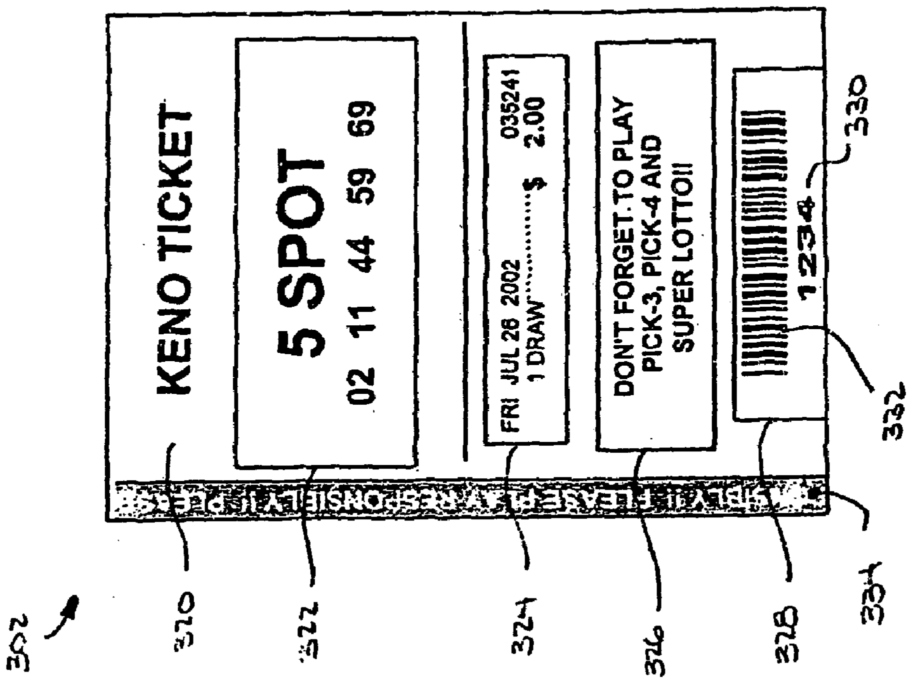
FIG. 4 illustrates an embodiment of a lottery ticket that may be generated by the lottery terminal unit of FIG. 2.

FIG. 4 illustrates the exemplary lottery ticket 302 that may be generated in response to the selections made by the player on the lottery slip 300. For example, the lottery ticket 302 may include a title 320 indicative of the game being played, a game area 322 that may provide results, confirmation information or other game-related information, and a status area 324 that may include wager information, drawing date, tracking information and the like. Further, the lottery ticket 302 may include an advertising area 326 where messages or other consumer information may be printed, and a coding area 328 that may have a tracking number 330 and a machine-readable code 332, such as a barcode, that may be read by the play slip/ticket reader 132 to retrieve information for the ticket. The tracking code 330 and graphical code 332 may be used to confirm the validity of the ticket, the location of purchase, amount of wager, numbers selected or any other desired information. The lottery ticket stock, or blank, may be preprinted with additional information such as, a public service message 334, a disclaimer, game rules or any other desired end-user license or contract information.

It will be understood that to play the exemplary Keno game described above, the player may manually fill-out the lottery play slip 300 using a pencil, pen or other input method, and the player slip 300 may be read by the lottery play slip reader 132 of the lottery terminal unit 116 to input the player's selections into the lottery system 100. Alternatively, the player may key-in the desired selections at the lottery terminal unit 104, or instruct a sales agent to key-in the desired selections. Once the player's selections are entered into the lottery system 100, the inputted data may then be used by the lottery terminal unit 104, the lottery server 106, and/or the central host computer 134 to generate the lottery ticket 302 with information corresponding to the player's selections. The ticket 302 may serve as the player's receipt, or the lottery terminal 104 unit may print an additional receipt for the player. At the same time, the information for the player selections may be stored in a database, such as in the memory of the lottery terminal unit 104 or server 106, in database 154 or memory 138 of central host computer 134, or other storage location for later use in ticket validation, auditing, compliance monitoring, and the like. At this point, the player may also pay for the wager and games being played.

Lottery Routine

In general, lotteries may be implemented as the networked games described above, or as an instant game. Networked lottery games, such as Lotto and Powerball-style games wherein players may enter a drawing at any one of a number of sales agent locations having lottery terminal units 104, 116, are typically communicatively connected through the network 110 to the central host computer 134, as described above. Lotto and Powerball-style games often offer multi-thousand or multimillion-dollar jackpots, in which five or six numbers are randomly drawn from a pool of twenty or more possible numbers, and the player(s) who has selected, or has had the system select, matching numbers is a winner. Network lotteries may further be implemented as a number game, in a "Pick-3" or "Pick 4" format, in which three or four numbers are drawn from the integers 0 through 9. Number games such as these, in contrast to typical Lotto or Powerball-style games, are often performed with replacements (e.g., the number 2 could be drawn twice) and may distinguish by order (e.g. 3-4-5 may be a different outcome than 5-4-3).

The instant or "scratch-off" lotteries may be implemented as an artfully decorated piece of cardboard or other material with game characters or indicia concealed by a covering material such as latex. In one embodiment, the player simply scratches off the covering material to reveal whether or not the ticket is a winner. An alternate embodiment requires the player to scratch off and reveal a subset of the indicia on the ticket, and the player may or may not win based on the revealed indicia. For example, the scratch-off ticket may include six covered indicia, and the player must uncover three matching indicia, such as three "$20 WIN" spots, in order to win the twenty-dollar prize on the ticket. If one or more selected indicia does not match the other indicia, the player loses the instant win game. It will be understood that the "scratch-off" game may be implement on a video terminal by presenting a variety of indicia hidden behind selectable images. A video scratch-off game would require a player to select an image in an attempt to match indicia hidden there under.

Figure 5:
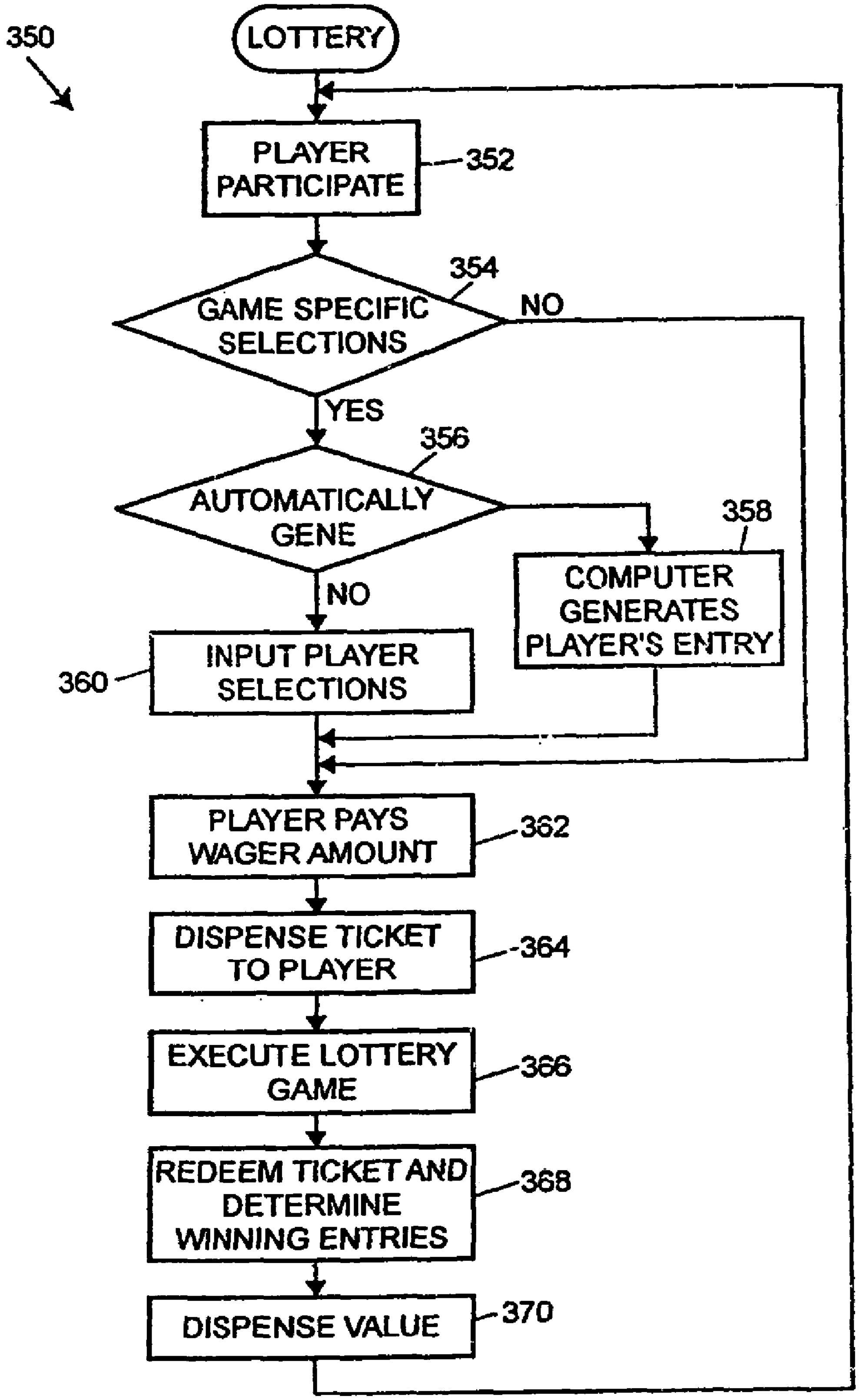
FIG. 5 is a flowchart of an embodiment of a lottery routine in which a player may participate.

FIG. 5 is a flowchart outlining a sample process flow of a lottery game 350 in which a player may participate. For the purpose of this example, and in order to describe various known lottery games, the routine is illustrated and described to implement and allow the player to participate in one of a plurality of lottery games. However, it will be understood by those skilled in the art that the routine may apply where any number of games is offered by the lottery system 100. Referring to FIG. 5, the manual lottery routine may begin at block 352 with a player deciding to participate in a lottery game. Based on the lottery game selected, the lottery game may require game-specific selections by the player when the player wagers or otherwise buys into the lottery game. If no game-specific selections are required at block 354, such as when purchasing an instant lottery and/or scratch-off ticket, the selection process is bypassed. If game-specific selections are required at block 354, a variety of game specific selections such as type of game to play, numbers or other game indicia to play in the game entry, the amount to wager, and number of times or drawings to play may be entered for the player. At block 356, the player may have the option to have the lottery system 100 automatically and randomly generate for the game characters or indicia to be played. If the player elects to automatically generate a ticket, control may pass to block 358 wherein one of the processors 140 or 204 may randomly generate a portion or all of the indicia for the player's entry. If the player elects to select characters or indicia to be used in the lottery game, either on a lottery play slip 300 or by input at the lottery terminal unit 104, they may do so at block 360.

Regardless of the manner in which the selections are made, upon completion of the selection process the player may pay the necessary wager amount at block 362 and the ticket may be dispensed as indicated at block 364. While shown and described as occurring in sequence with the player electing to participate, making game specific selections automatically or manually if necessary, paying the wager amount, and having a lottery ticket dispensed, the steps may occur in any order or concurrently as may be necessary or desired to implement a given lottery game or games. For example, the lottery terminal unit 104 may be configured to require a player to deposit money in a coin slot, currency reader, credit card reader or other value-deposit mechanism, before selecting a game and/or game-specific selections. Alternatively, sales agents may take all the information for the player's entry for the lottery game, print the corresponding lottery ticket and hand the ticket to the player before receiving the wager amount from the player. Those skilled in the art will understand that the steps of selecting a game, making game-specific selections, paying a wager amount and dispensing a lottery ticket may occur in any necessary sequence to accept player entries for the lottery games.

After the players' entries for the lottery game(s) are entered and the players have paid the necessary wager amounts, the lottery games may be executed at block 366. For lottery games involving a drawing, such as Lotto, Powerball-style games, Keno, Bingo, Pick-3 and Pick-4, the drawings may occur on a specified day and time, or at predetermined intervals, with the players being required to make their entries prior to the drawings. For other lottery games initiated by the players, such as instant win games and scratch-off games, the execution of the game occurs when the player performs the necessary actions with the lottery ticket to play the game. For each of these games, however, the execution of the lottery game involves a distinct process for determining the outcome of an occurrence of the game.

In a Lotto game, the players may wager on how many numbers they can match from a specified range of numbers or symbols. For example, during the game-specific selection, the players may select, or have the lottery system 100 select, six numbers from the range of whole numbers from, for example, 1 to 56. At the time of the drawing for the Lotto game, six numbers may be selected from the range of whole numbers from 1 to 56. The six numbers may be selected mechanically using a blower-type ball drawing machine containing a fifty-six balls, each having a number between 1 and 56 printed thereon, electronically using a random number generator or other random selection mechanism at, for example, the lottery host computer 134, or by any other mechanism for randomly selecting a subset of elements from a known set of elements. Winning player entries may be evaluated by comparing the players' selections to the drawing selections to determine the level of correspondence between the players' selections and the drawing selections. The greater the correspondence, the greater the prize may be, up to the awarding of a progressive jackpot where a player's selections exactly match the drawing selections. If no player matches all six numbers in a Lotto drawing, the progressive jackpot may roll over to the next drawing, and the jackpot often may accumulate to tens of millions of dollars.

Powerball-style games may be similar to Lotto games, with players selecting a subset of a known range of numbers or symbols from multiple ranges of numbers or symbols. In one example of a Powerball-style game, players' entries consist of five numbers selected from the range of 1 to 53, and one additional number selected from the range of 1 to 42. When the drawing occurs, five numbers are selected from the range of 1 to 53, and one number is selected from the range of 1 to 42. As with Lotto games, the players' entries may also be evaluated by comparing the players' selections with the drawn selections, with prizes being awarded based on the level of correspondence up to a progressive jackpot for matching all five numbers and the additional number. Matching some or all of the five numbers from the range of 1 to 53 and not matching the one number from the range of 1 to 42, or matching the one number from the range 1 to 42 and none or up to four of the numbers from the range of 1 to 53 may result in winning a fixed prize amount, while matching all five numbers from the first range and the one number from the second range may result in winning a jackpot.

In contrast to progressive games such as Lotto and Powerball-style games, non-progress games, sometimes referred to a Cash Lotto may typically be held twice a week and entail the selection of five rather than six numbers from a predefined range of numbers. As with progressive games, the non-progressive game may be evaluated based on the level of correspondence between the numbers selected by the players and the numbers drawn from the predetermined range. Awards for the non-progressive games may be either based on a fixed pay table or funded by the players' wagers as a pari-mutuel pool. Consequently, non-progressive games do not have a jackpot that builds from game to game until it is won, and instead the jackpot may revert to the lottery sponsor if no player matches all five drawn numbers. The jackpot for a Cash Lotto is usually of the magnitude of one to several hundred thousand dollars. While the jackpots are relatively small, players may have a much better chance of winning the Cash lotto games than for the weekly progressive lotteries.

Keno games are well known for both lottery games and casino games. In typical Keno games, players select one to ten or one to fifteen numbers from the range of 1 to 80. At the time of the drawing, twenty numbers are selected from the range of numbers from 1 to 80. Players win based on the level of correspondence, or lack thereof, between the selected numbers and the drawn numbers, with the win amount for any player entry being determined based on the level of correspondence and the amount of numbers selected by the player. For example, a player may be awarded a larger prize for selecting five numbers and matching all five numbers, than for selecting ten numbers and matching five of those numbers.

Bingo is another common lottery and casino game. In Bingo, each player selects one or more game card consisting of a five-by-five matrix of numbers from the range of 1 to 75. The first column contains five numbers selected from the range of 1 to 15, the second column contains five numbers selected from the range of 16 to 30, the third column typically contains four numbers selected from the range of 31 to 45 and a square entitled "FREE SPACE" in the center, the fourth column contains five numbers selected from the range of 46 to 60, and the fifth column contains five numbers selected from the range of 61 to 75. At the time of the drawing, numbers from the range of 1 to 75 are drawn randomly until at least one player matches a predetermined winning pattern, such as matching all the numbers in a row, column or diagonal, matching the four corners of the Bingo card, or matching any other pattern designated as a winning pattern. The player or players matching a winning pattern first are awarded a prize for the game. Larger prizes may also be awarded for matching particular patterns, or for matching the winning pattern within a predetermined number of drawn balls.

Pick-3 and Pick-4 games are somewhat similar to Powerball-style games and Lotto games, wherein players select numbers or symbols from a predetermined range of numbers or symbols. In a Pick-3 game, players select a three-digit number (from 000 to 999) for their entry. At the time of making an entry, the player may be able to elect whether the three digit number must match the drawn three digit number exactly (straight bet) or whether the selected digits may appear in any order in the drawn three digit number (box bet). For example, if a player plays "123" in the Pick-3 as a straight bet, the player may only wins if the number "123" is drawn, while a player playing "123" as a box bet may win if "123," "132," "213," "231," "312" or "321" are drawn. In order to allow for the increased probability of winning a box bet, the player may either be required to wager a larger amount to box the bet, or be awarded a smaller prize amount due to the increased probability of having a winning entry. At the time of the drawing, three numbers are each drawn randomly from a separate set of numbers in the range of 0 to 9 such that digits may be repeated in the drawn three-digit number. In one implementation, three separate blower-type ball machines are used to conduct the drawing, with each machine containing ten balls each having a number between 0 and 9 printed thereon. The first-drawn ball is the first digit of the winning number, the second-drawn ball is the second digit of the winning number, and the third-drawn ball is the final digit. Pick-4 games are conducted in a similar manner using four digit numbers.

As previously mentioned, scratch-off lotteries do not involve a separate drawing conducted by the lottery. Instead, the lottery ticket includes indicia for conducting and determining the outcome of the scratch-off game, with the indicia being covered by a material that may be scratched off to expose the indicia disposed there under. For other games, such as pull tab games, the game indicia and/or the entire ticket may be covered by a covering sheet or substrate, with all or portions thereof being removable to expose the game indicia when the game is played by the player. The scratch-off or pull tab games may configured so that each ticket is predetermined to be a winning or losing entry for the game, or configured so that the each ticket may be either a winning or losing entry, with the outcome being determined based on the order or manner in which the player exposes the covered game indicia on the lottery ticket. In the former type of scratch-off or pull tab game, the indicia is configured to indicate whether the ticket is winning or losing entry, and the player merely removes the covering to expose the indicia and evaluates the indicia to determine whether the ticket is a winning or losing ticket. Any player purchasing the ticket will achieve the same outcome.

In the latter type of scratch-off or pull tab game, the player typically removes the covering from a subset of the indicia disposed on the lottery ticket, and the player wins if the player selected a predetermined winning subset of the indicia. For example, the indicia on the lottery ticket may represent different dollar amounts that may be awarded for winning numbers with three of the dollar amounts being the same, and the three remaining dollar amounts being different. To play the game, the player may select and remove the covering from three of the dollar amounts. If the player exposes the three matching dollar amounts, the player wins the corresponding prize amount. If the player exposes one or more of the non-matching dollar amounts, the player does not win a prize for that lottery ticket. Consequently, each ticket may potentially be a winning ticket, but the ticket will only be a winning ticket if the player selects and uncovers the winning combination of indicia.

Upon completion of the lottery game, the lottery tickets may be redeemed by the players and the winning entries may be determined at block 368. For the lottery games for which a drawing is conducted with the outcome of the drawing being compared to each of the player's entries to determine whether the entries are winning entries, the results of the drawing may be entered and recorded in the lottery system 100 at the lottery host computer 134, for example. In implementations where the player entries are stored in databases at the lottery host computer 134 and/or the lottery terminal units 104, the player entries for the occurrence of the lottery game may be compared to the outcome of the lottery drawing to determine which player entries are winning entries. Based on the results of the comparison, the lottery system 100 may generate a listing of winning entries for the occurrence of the lottery game.

When a player presents a lottery ticket at a sales agent location for redemption, the lottery ticket may be inserted in the ticket reader 132 of the lottery terminal unit 104. The lottery terminal unit 104 may use the information encoded on the lottery ticket to retrieve information from the lottery system 100 to determine whether the lottery ticket is a winning ticket. Alternatively, where the player's selections are encoded on the lottery ticket, the lottery terminal unit 104 or central host computer 134 may compare the player's selections to the drawing outcome to determine whether the lottery ticket is a winning ticket, and determine the corresponding award amount. Still further, the lottery ticket, and in particular a scratch-off and pull tab tickets or Bingo card, may be evaluated by a sales agent to determine whether the lottery ticket is a winning ticket, and any corresponding prize award.

Once the prize award for the lottery ticket is determined, the value may be dispensed to the player corresponding to the prize amount determined for a winning lottery ticket at block 370. The dispensed value may be in any appropriate form, including direct cash payments by the sales agent to the players, printing and issuance of a credit voucher or check at the lottery terminal unit 104, applying credit to a debit card, credit card, smart card, player's lottery or bank account, or any other mechanism for dispensing value to the player.

Figure 6:
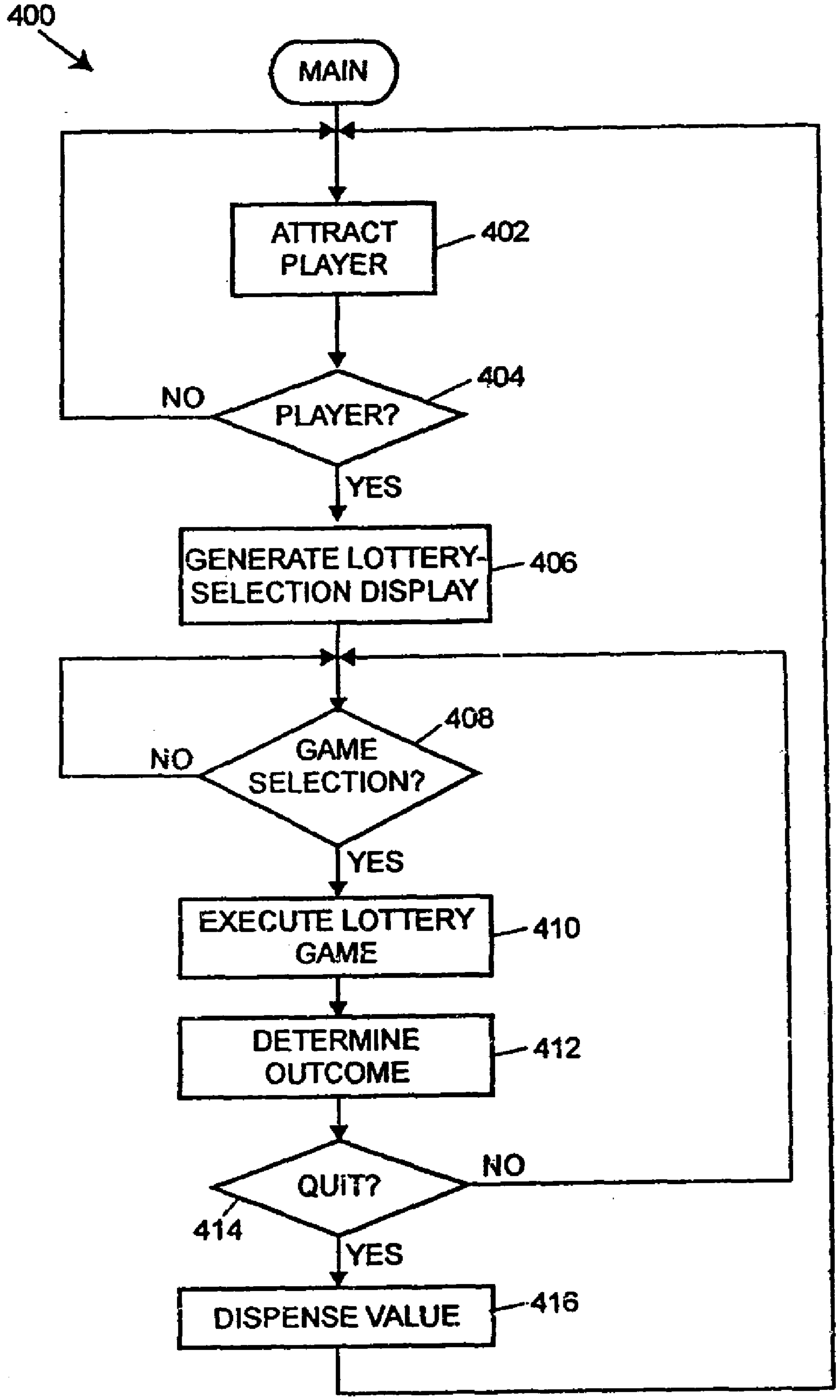
FIG. 6 is a flowchart of an embodiment of a lottery routine including an instant win game.

FIG. 6 is a flowchart of an alternative embodiment of an automated main operating routine 400 that may be stored in the memory 202 of the controller 200 of the lottery terminal unit 104 that may be adapted to allow the player to play interactive lottery games, such as video poker, video Keno, video blackjack, video Bingo and the like. The main routine 400 may begin operation at block 402 during which an attraction sequence may be performed in an attempt to induce a potential player to play the lottery terminal unit 104, 116. The attraction sequence 402 may be performed by displaying one or more video images on the display 128 and/or causing one or more sound segments, such as voice or music, to be generated via the speakers 216. The attraction sequence 402 may include a scrolling list of video lottery games that may be played on the lottery terminal unit 104, 116 and/or images of various lottery games being played, such as video poker, video Keno, video blackjack and the like.

During performance of the attraction sequence, if a potential player makes any input to the gaming unit 104 as determined at block 404, the attraction sequence may be terminated and a game-selection display may be generated on the display 128 at block 406 to allow the player to select a lottery available on the lottery terminal unit 104. The lottery terminal unit 104 may detect an input at block 404 in various ways. For example, the lottery terminal unit 104 could detect if the player presses any button on the control panel 124, could determine whether the player deposited currency into a coin slot or currency reader, inserted a smart card into the card reader 130, or recognized any other input of value by the player.

The game-selection display generated at block 406 may include, for example, a list of video lottery games that may be played on the lottery terminal unit 104 and/or a visual message to prompt the player to deposit value into the lottery terminal unit 104. While the game-selection display is generated, the lottery terminal unit 104 may wait for the player to make a game selection. At block 408, if no game selection is made within a given period, the operation may branch back to block 402. Upon selection of one of the games by the player as determined at block 408, the controller 200 may execute one of a number of lottery game routines at block 410 to allow player to play the selected lottery game. The lottery game routine executes and allows the player to play the selected lottery game. For example, when playing video poker, the player may be allowed to indicate whether to hold or drop cards dealt by the lottery terminal unit 104 to the player. In video Keno, the player may select up to ten or fifteen numbers from 1 to 80 to use as the player's game entry. In video blackjack, the player may indicate whether to hit or stand on a hand, or split or double down on a hand. At the end of the game, the outcome may be determined at block 412. The lottery terminal unit 104 may determine the amount of any prize won by the player and corresponding to the player's wager on the game, and increment the amount of credits for the player on the lottery terminal unit 104.

At this point, the player may elect to quit the game and cash out the player's credits at block 414. If the player wishes to stop playing the lottery terminal unit 104 and "Cash Out" any accumulated credits, the controller 200 may dispense value to the player at block 416 based on the outcome of the game(s) played by the player. The operation may then return to block 402. If the player does not wish to quit as determined at block 414, the routine may return to block 406 where the game-selection display may again be generated to allow the player to select another game.

Lottery Numbers Game with Progressive Extension Game

Figure 7:
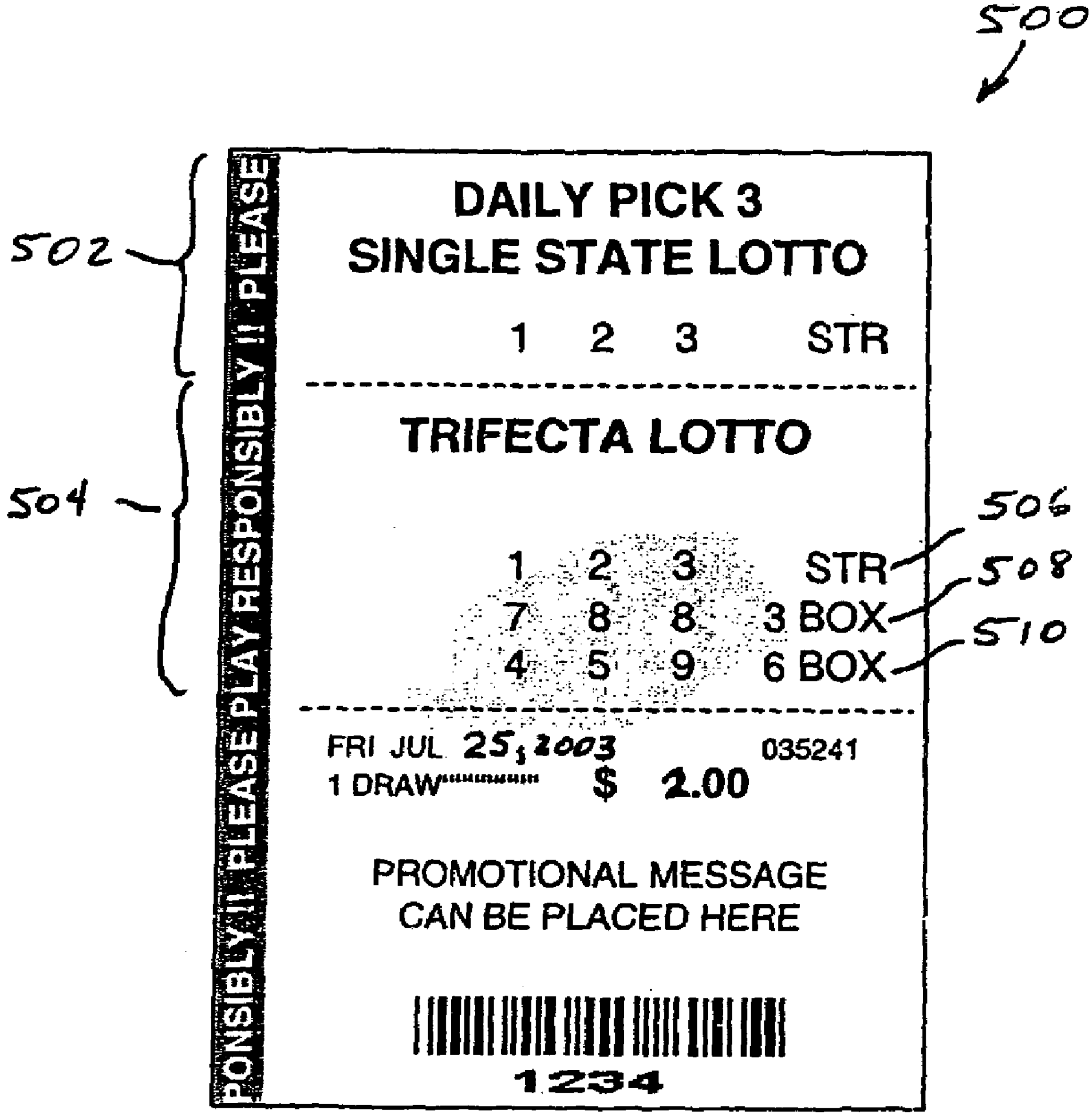
FIG. 7 illustrates an embodiment of a lottery ticket that may be generated for traditional lottery numbers game and progressive extension game that may be generated by the lottery terminal unit of FIG. 2.

A traditional numbers game, such as a Pick 3 or Pick 4 game, may be modified to include an extension game having a progressive jackpot so that each player may place an additional wager to participate in the extension game and have an opportunity to win the progressive jackpot in addition to participating in the traditional game. In one embodiment, the extension game may be added to a traditional game in single jurisdiction, or may be played independently in the jurisdiction, and may include a plurality of numbers game selections forming the entry for the extension game. FIG. 7 illustrates one embodiment of a lottery ticket 500 having indicia thereon for a numbers game entry 502 and for an extension game entry 504. The numbers game entry 502 may be for a Pick 3 game drawing having the number "123" played as a straight bet. The extension game entry 504 may include three three-digit numbers 506–510, and each number 506–510 may be played straight or boxed. The lottery ticket 500 may correspond to an entry for the numbers game and extension game entered at lottery terminal unit 104, either manually or via an appropriate play slip configured for the numbers game and extension game. Further, a player may be required to place an additional wager for the extension game.

The numbers game may be played in the manner described above for Pick 3 or Pick 4 games, with the numbers game entry 502 be evaluated against the drawn numbers for the occurrence of the numbers game. For the extension game, the plurality of numbers in a player's entry may be compared to a corresponding number of drawn numbers to determine whether the entry may result in the awarding of a progressive jackpot for matching all numbers, or in a fixed award amount for matching some but less than all of the drawn numbers. For example, the extension game corresponding to the extension entry 504 of lottery ticket 500 may include three separate drawings of three digit numbers that may be compared to the three-digit numbers 506–510 of the extension game entry 504. Each of the extension game drawings may be conducted separately from the drawing for the corresponding occurrence of the numbers game or, alternatively, the drawn number from the numbers game may be used for one of the drawings for the occurrence of the extension game.

After the drawings for the extension game are completed in a manner as previously described, the drawn numbers may be compared by the host computer 134 and/or the lottery terminals 104 to the numbers 506–510 of the extension game entries 504 to determine which entries in the extension game may be winning entries. Depending on the implementation desired by the lottery sponsor, each of the drawn numbers may be compared to a corresponding one of the three-digit numbers 506–510 of the extension game entries 504, to each drawn number may be compared to each of the three digit numbers 506–510 of the extension game entries 504, or to both. The drawn numbers may be compared to the numbers 506–510 of the extension game entries 504 in the same manner described above based on the bet type, such as a straight bet or a box bet, to determine whether numbers 506–510 match the drawn numbers.

Awards may be provided for the extension game entries 504 based on the level of correspondence between the drawn numbers for the occurrence of the extension game and the numbers 506–510 of the extension game entries 504. For example, a progressive jackpot may be awarded for exactly matching the first drawn number with the first number 506 of the extension game entry 504, matching the second drawn number with the second number 508 of the extension game entry 504, and matching the third drawn number the third number 510 of the extension game entry 504. If desired, the lottery sponsor may impose the additional requirement that the numbers 506–510 of the extension game entries 504 each be entered as straight bets in order to win the progressive jackpot, and award lesser prizes if all three numbers 506–510 of an extension game entry 504 match the drawn numbers when one or more of the numbers 506–510 are made with box bets. In a similar manner as other progressive-type games discussed herein, pay tables may be established setting out award amounts to be paid based on varying levels of correspondence between the drawn numbers for an occurrence of the extension game and the numbers 506–510 of an extension game entry 504. Those skilled in the art will understand that pay tables for the extension game may be configured to match levels of correspondence between the drawn numbers and the entry numbers 506–510 with award amounts to achieve award payout rate for the given implementation of the extension game.

In another embodiment of the extension game, the lottery sponsor may desire to provide each entry in an occurrence of the extension game with an equal chance at winning the progressive jackpot. In order to provide each extension game entry with an equal chance at winning the progressive jackpot, it may be necessary to implement specific rules governing the selection of the extension game numbers for entries in the extension game. The rules may relate to the selection of numbers, and to the selection of bet types used for the extension game entries. As noted above, there are at least two types of bets (straight and boxed) that may be played in the traditional number game, with the bet types having different probabilities of winning. A boxed bet on a three-digit number is six times more likely to pay off than a straight bet on the same number having no digits repeated. A probability distinction also exists for boxed bets for numbers having distinct digits (six chances of winning) and numbers having repeated digits (two repeated digits=three chances to win; three repeated digits=one chance to win). Consequently, a set of rules establishing criteria for selecting numbers for an entry in the extension game based on restrictions on the number of repeated digits and on betting types that may be used may result in each entry in the extension game having an equal chance at winning the progressive jackpot.

The extension game entry 504 of FIG. 7 illustrates an extension game entry entered in conformance with a set of rules for generating extension game entries having equal probabilities of winning the progressive jackpot. The extension game entry 504 may have been generated using the following rules:

1) One of the extension numbers must have a repeated digit and be a boxed bet;
2) One extension number must have no repeated digits and be a boxed bet;
3) One extension number must be a straight bet; and
4) The straight bet number may not be a permutation of either of the boxed bets.

The extension game entry 504 of lottery ticket 500 satisfies the selection rules. Regarding rule number one, the second number 508 repeats one digit ("8") and is a boxed bet having three ways to match a drawn number ("788," "878" and "887"). Rule number two is satisfied by the third number 510 having the number "459" with a boxed bet resulting in three ways to match a drawn number ("459," "495," "549," "594," "945" and "954"). Rules three and four are satisfied by the first number 506 with the number "123" having no repeated digits, being a straight bet, and not being a permutation of either "788" or "459."

Each extension game entry 504 may be established based on the application of rules 1–4. The lottery gaming units 104 may be configured to validate and/or generate extension game entries based on rules 1–4. If a player desires to select all three numbers 506–510 for the occurrence of the extension game, a lottery terminal unit 104 may be configured to evaluate the numbers entered by the player either manually or via a play slip, and to prompt the player to change one or more of the numbers 506–510 that may not comply with rules 1–4. Once the player's extension game entry complies with rules 1–4, the lottery terminal unit 104 may print and dispense tickets similar to the lottery ticket 500 to the player. Alternatively, the lottery terminal units 104 may be configured to generate extension game entries 504 having numbers 506–510 in conformance with rules 1–4, or allow a player to select one of the numbers 506–510 and to generate the remaining numbers 506–510 in view of the number specified by the player and in conformance with the rules 1–4. In the latter scenario, players may still have the opportunity to select their favorite and bet type while still maintaining the same probability of winning the progressive jackpot. Moreover, the lottery gaming units 104 may be configured to use the base game number and/or bet type as a starting point for generating the remaining numbers 506–510 of the extension game entry 504.

If a player selects a straight bet in the extension game, the above rules may be applied, and the remaining two quick picked extension game numbers may be selected so that a box bet with a repeated digit and a box bet with no repeated digits are generated. Alternately, if a player selects a box bet with no repeated digits, the two generated quick pick numbers may be a boxed bet with one repeated digit and a straight bet. The third possibility is that a player may select a boxed bet with one repeated digit. The two generated quick pick numbers may be a boxed bet with no repeating digits, and a straight bet. It should be noted that the straight bets discussed herein may include repeated digits, or may include three distinct digits. However, per the fourth rule, none of the straight bets may be a permutation of any of the box bets.

Figure 8:
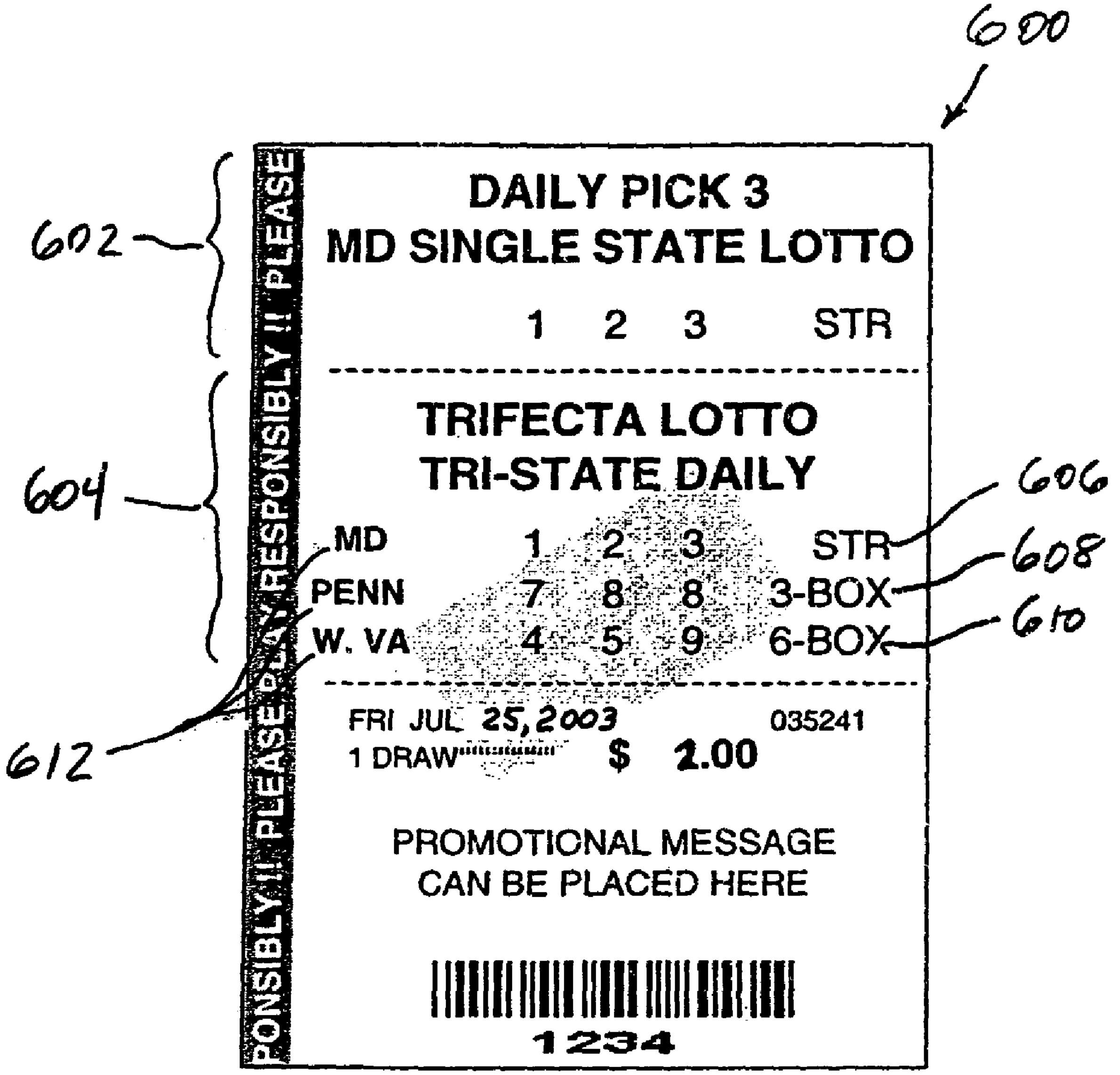
FIG. 8 illustrates an alternative embodiment of a lottery ticket that may be generated for traditional lottery numbers game and progressive extension game that may be generated by the lottery terminal unit of FIG. 2.
Figure 1:
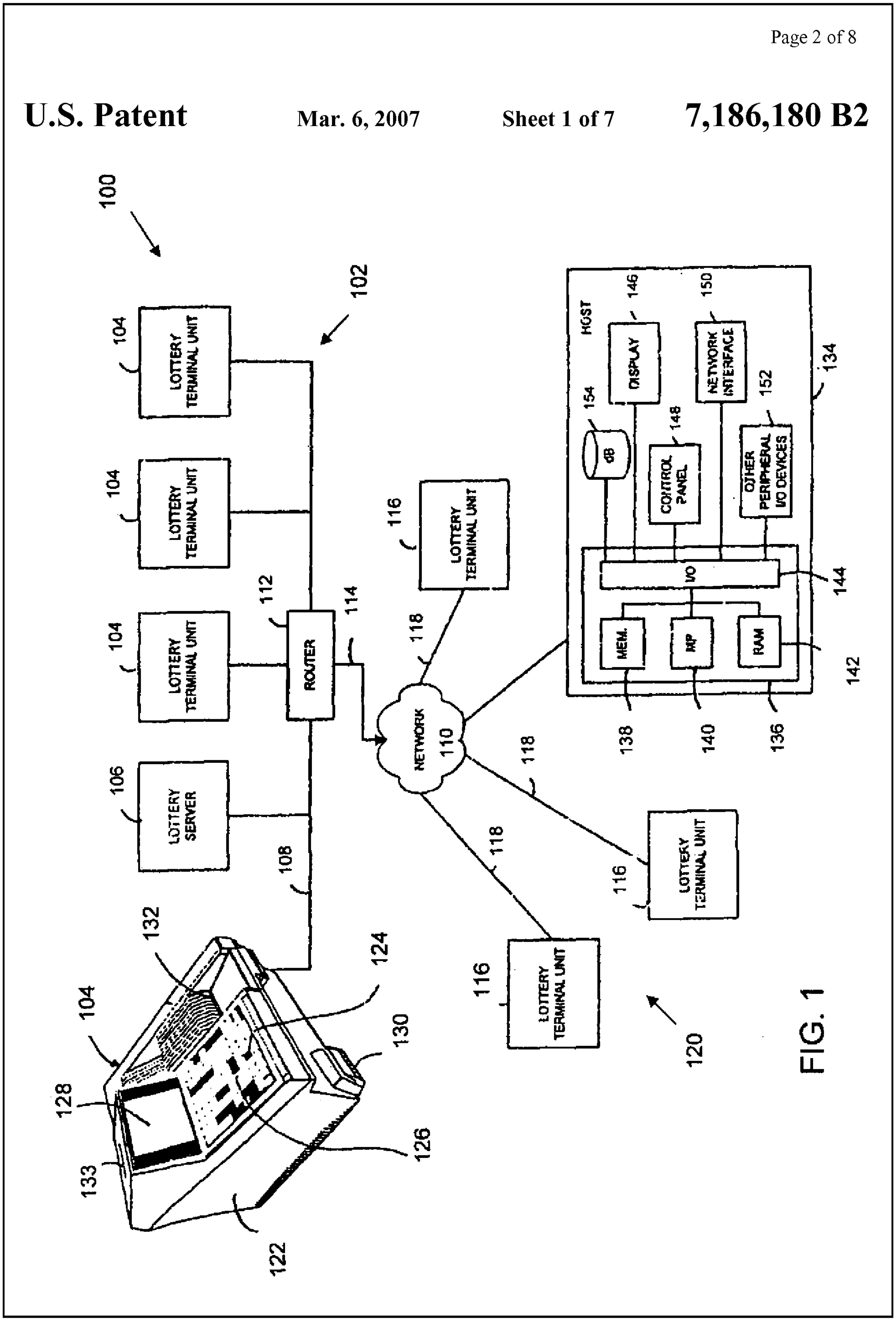
Figure 2:
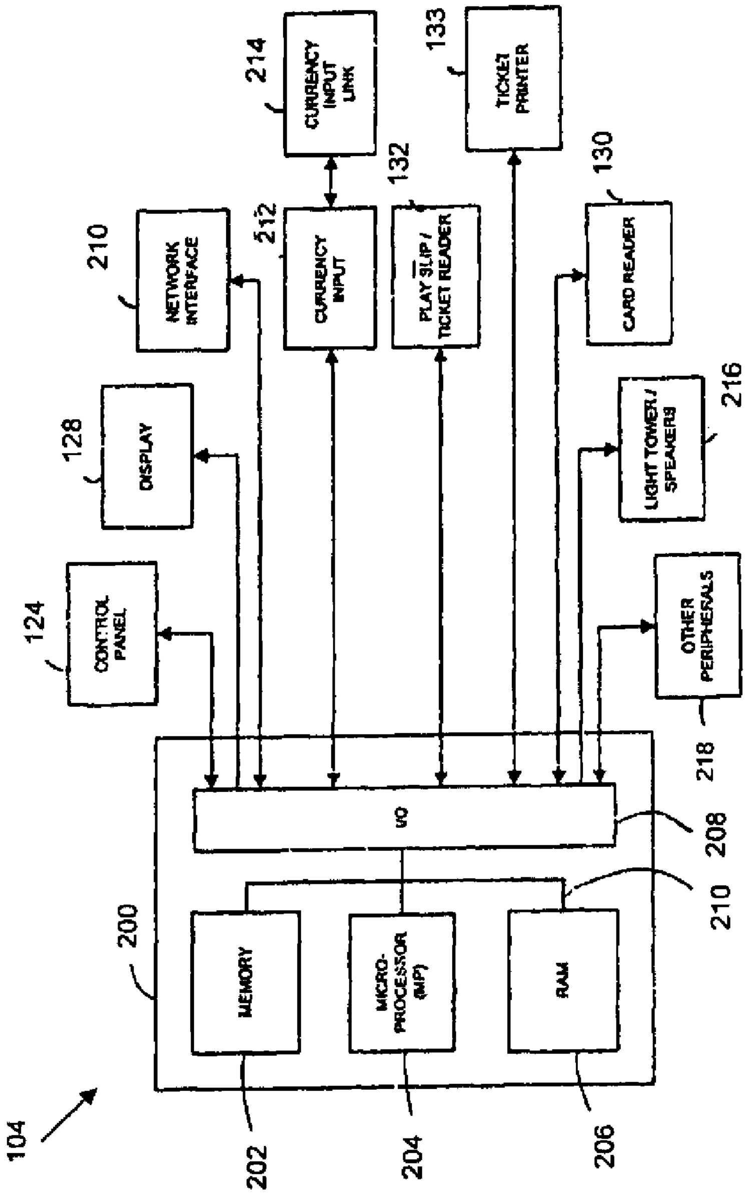
Figure 4:
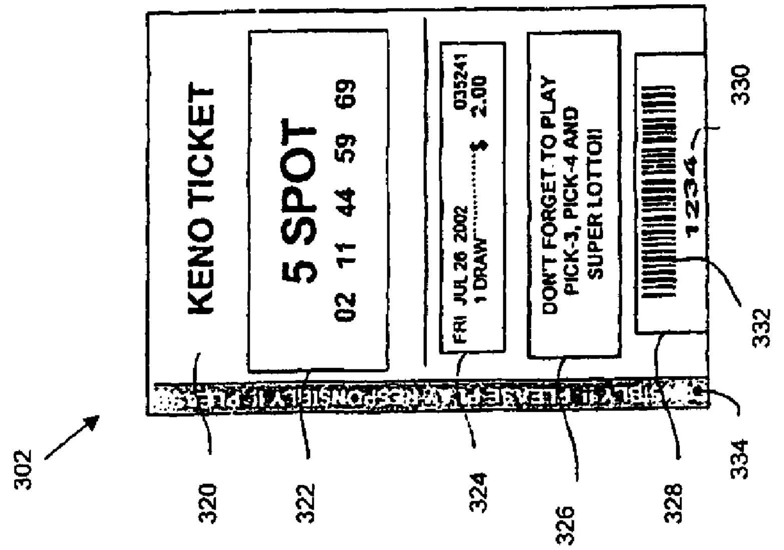
Figure 3:
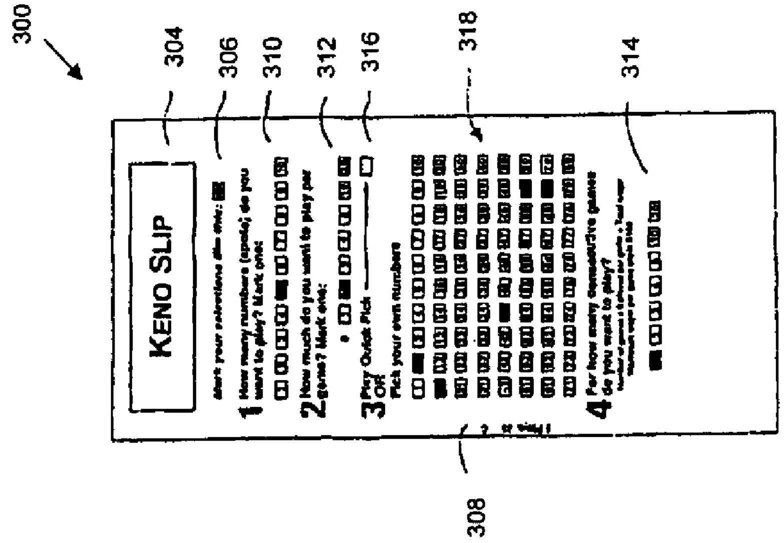
Figure 5:
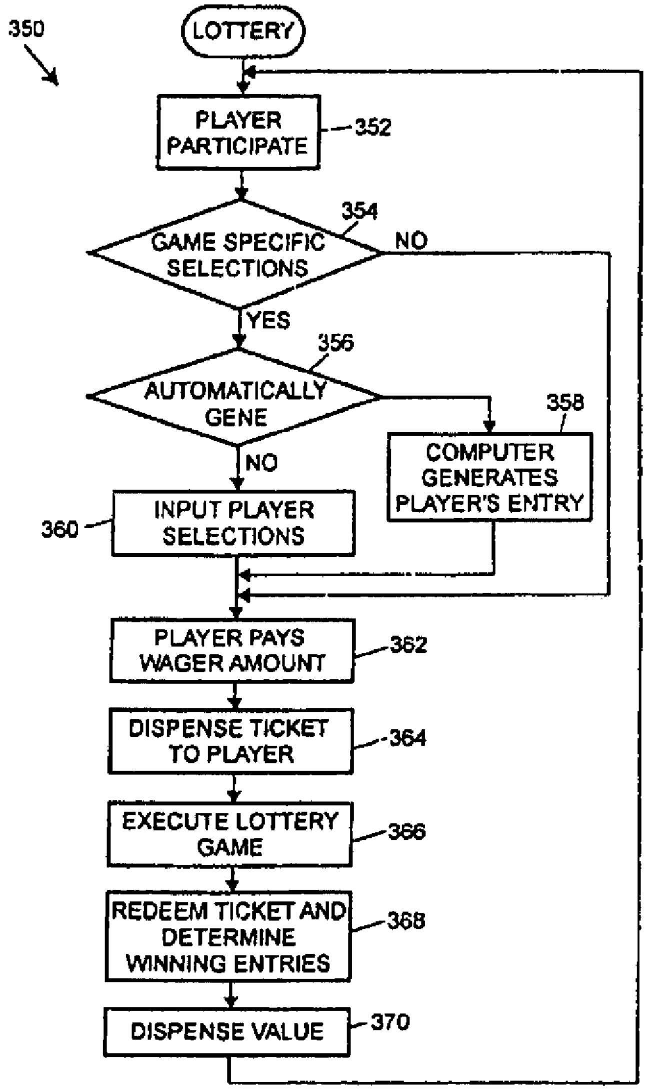
Figure 6:
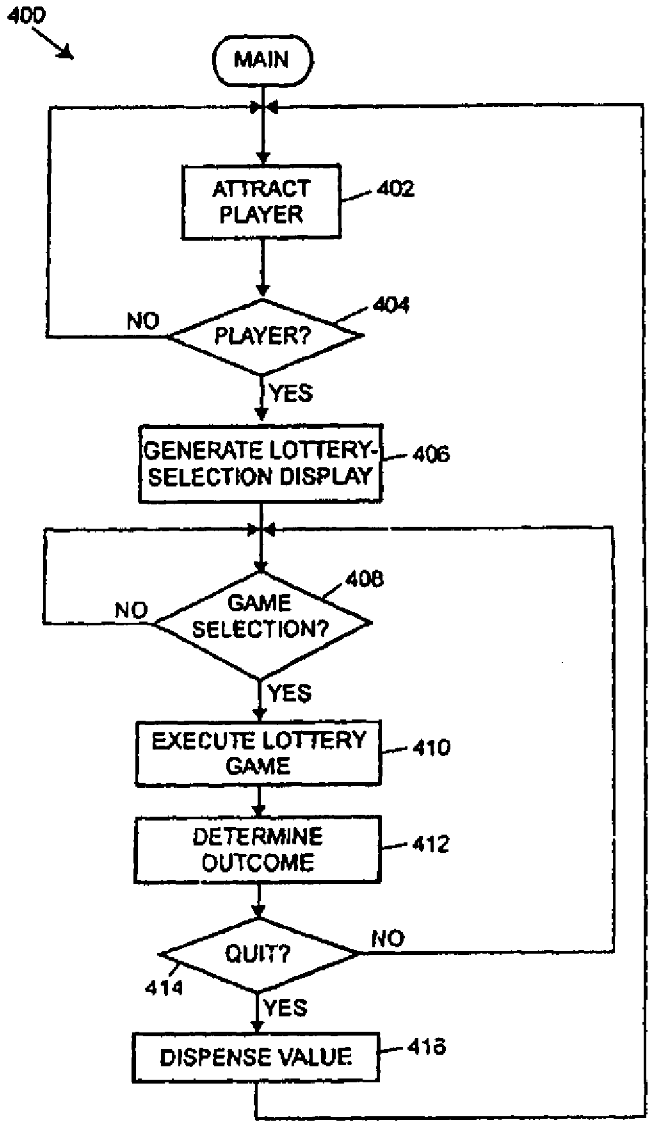
Figure 7:
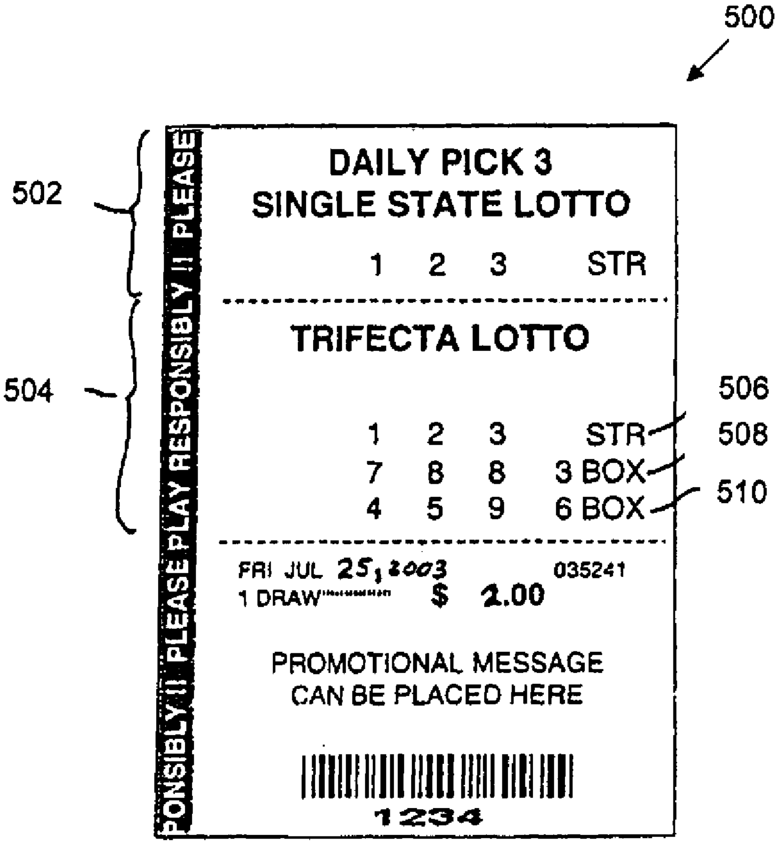
Figure 8:
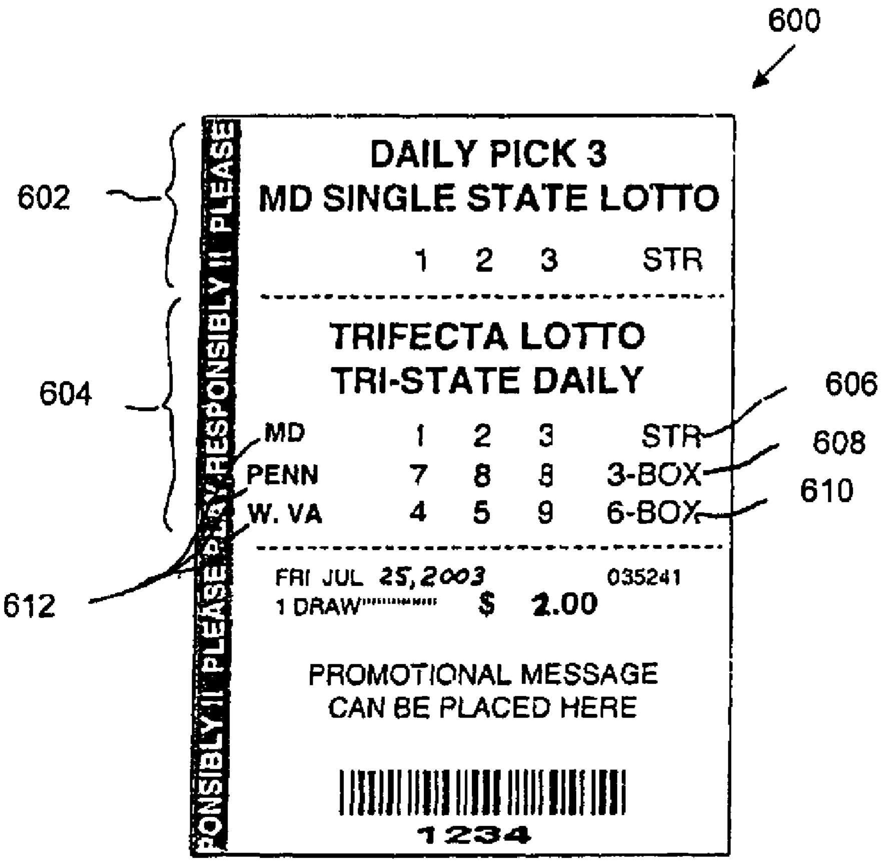
Figure 1:
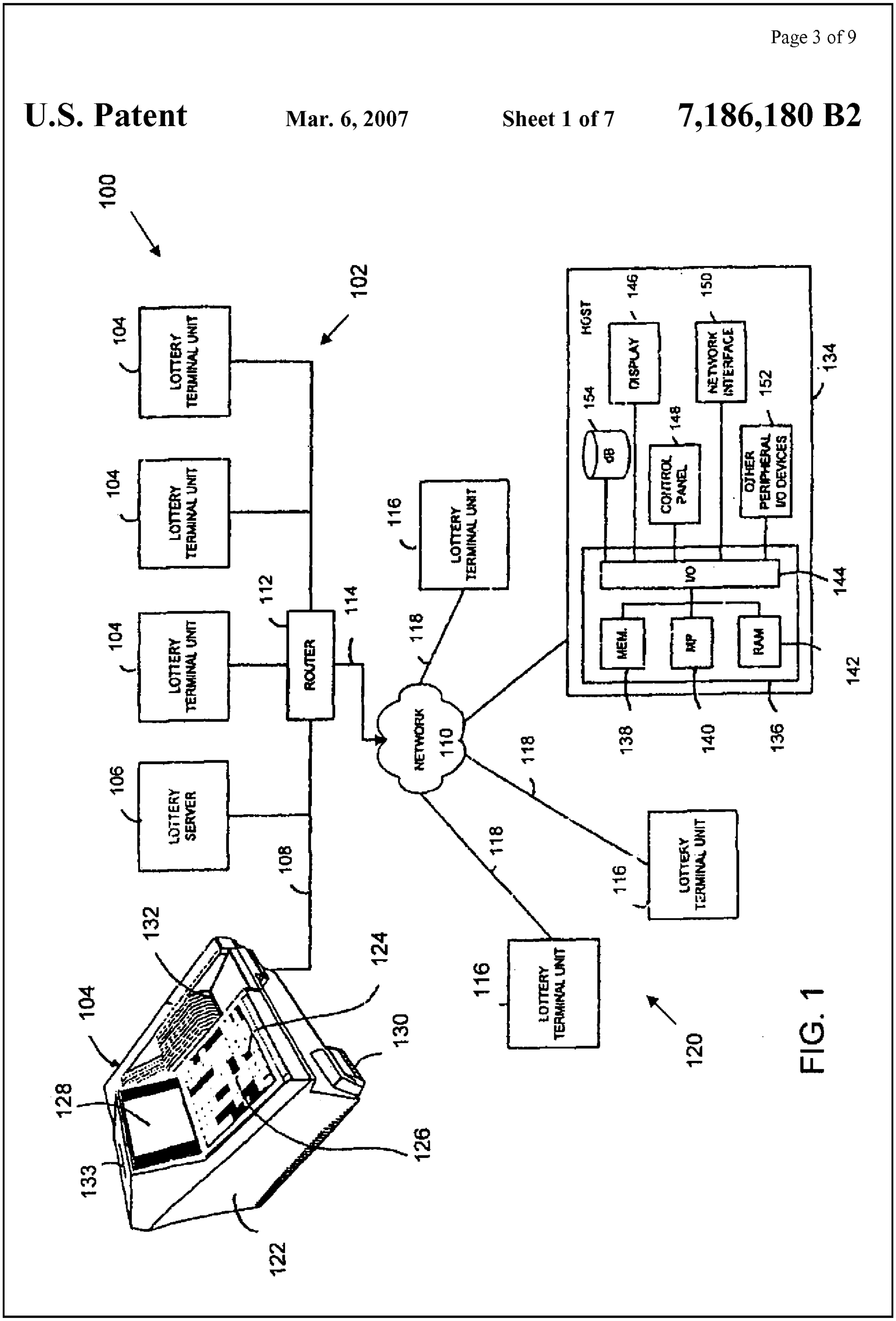
Figure 2:
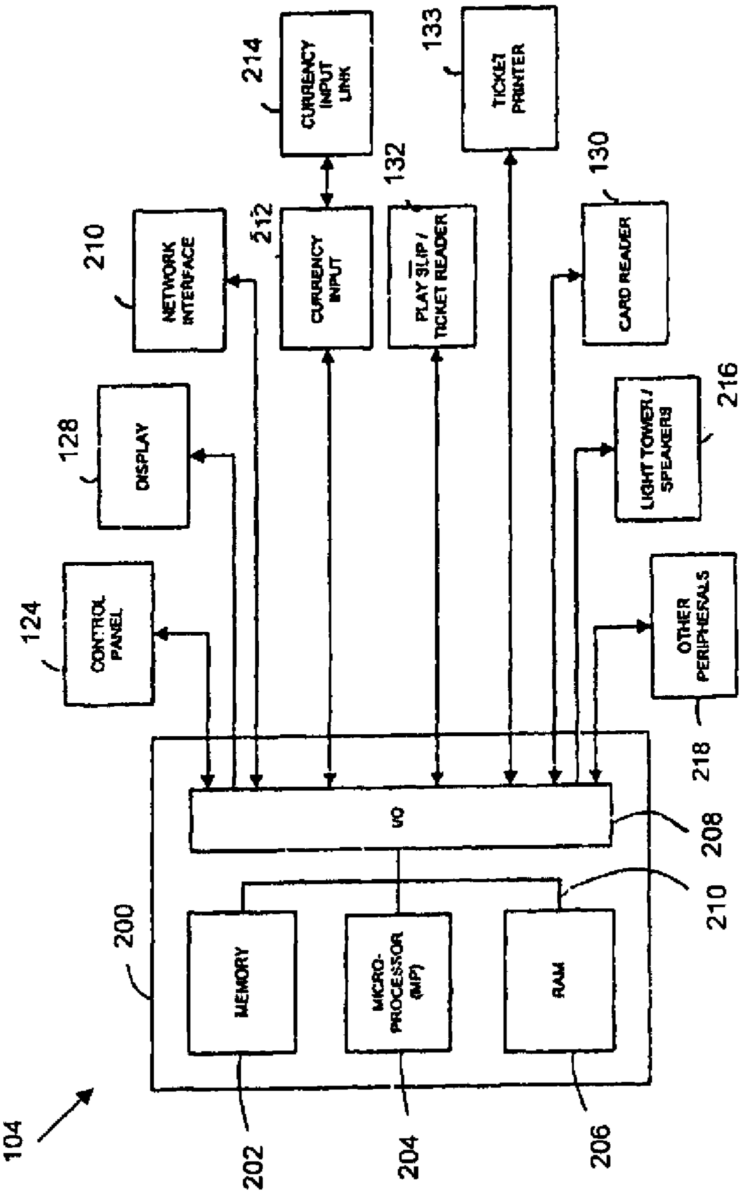
Figure 4:
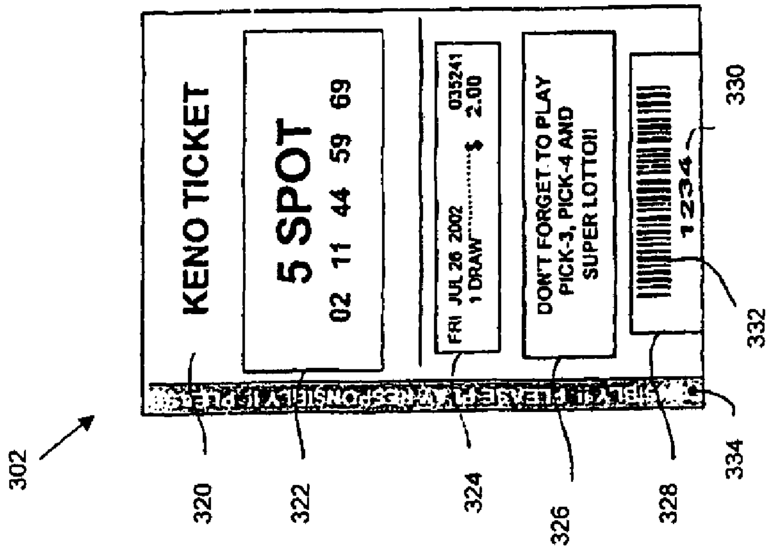
Figure 3:
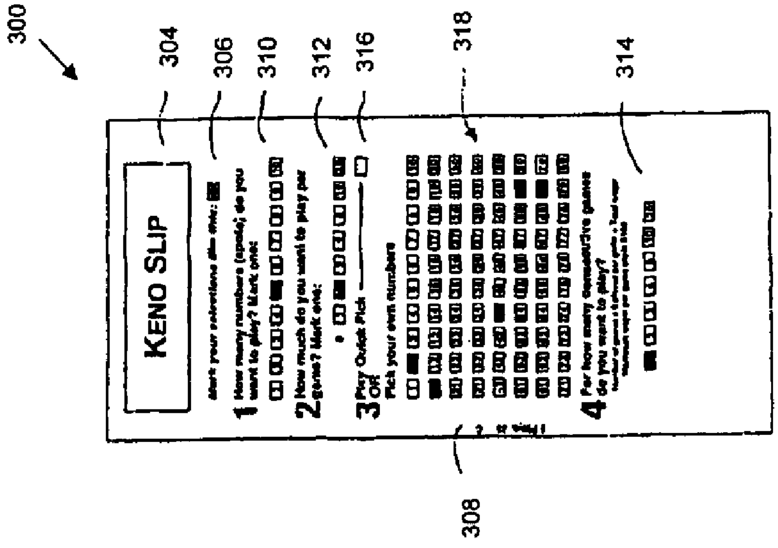
Figure 5:
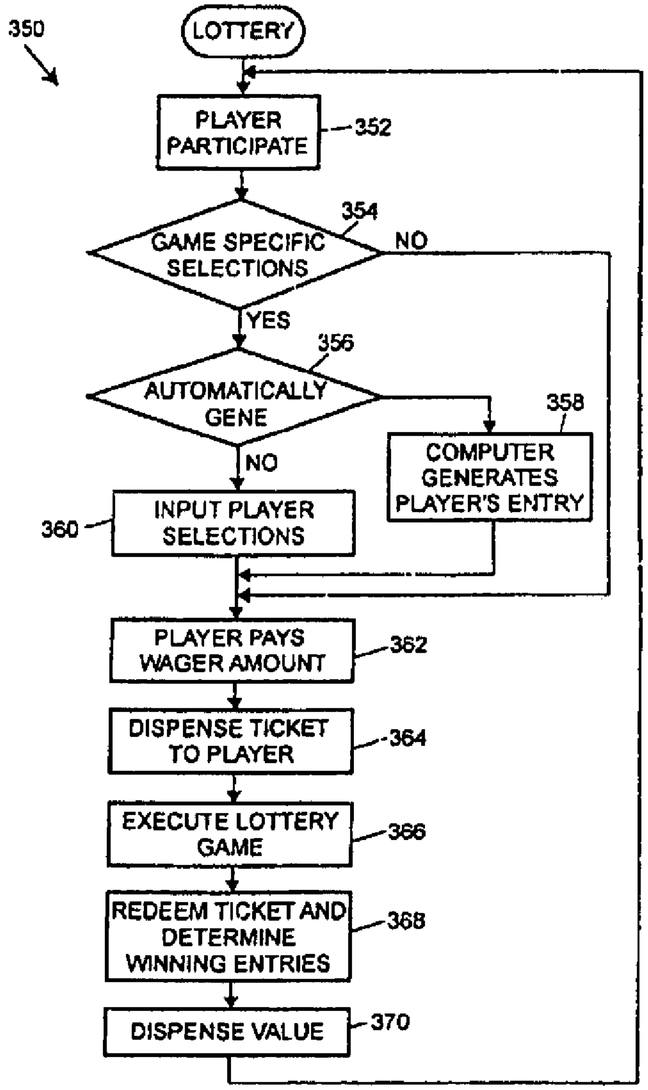
Figure 6:
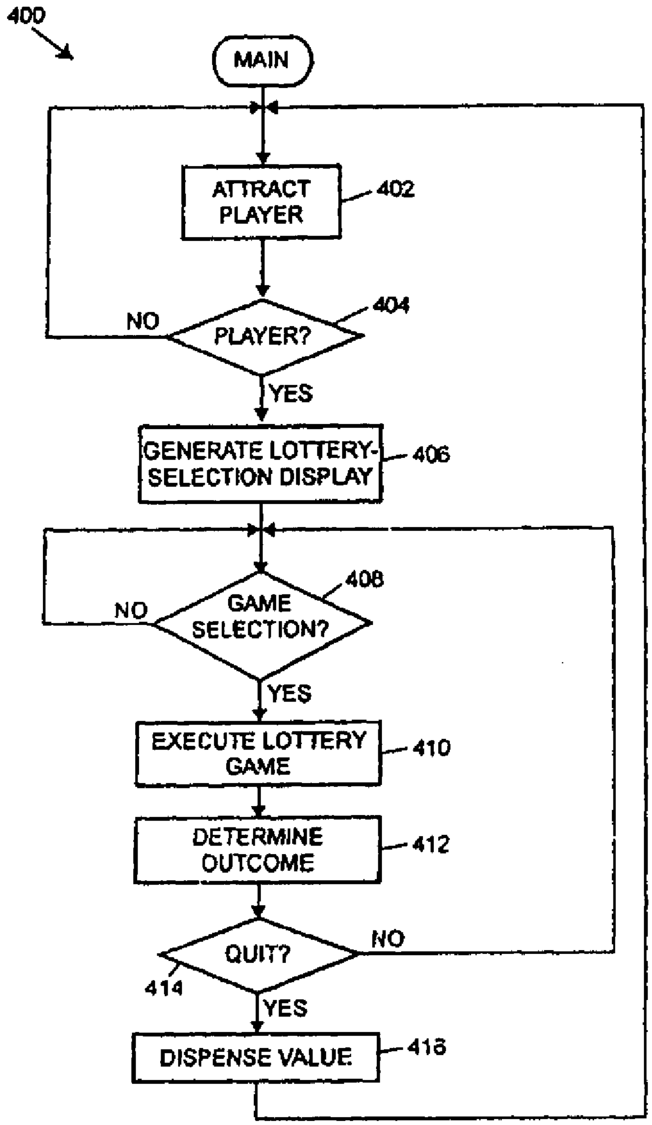
Figure 7:
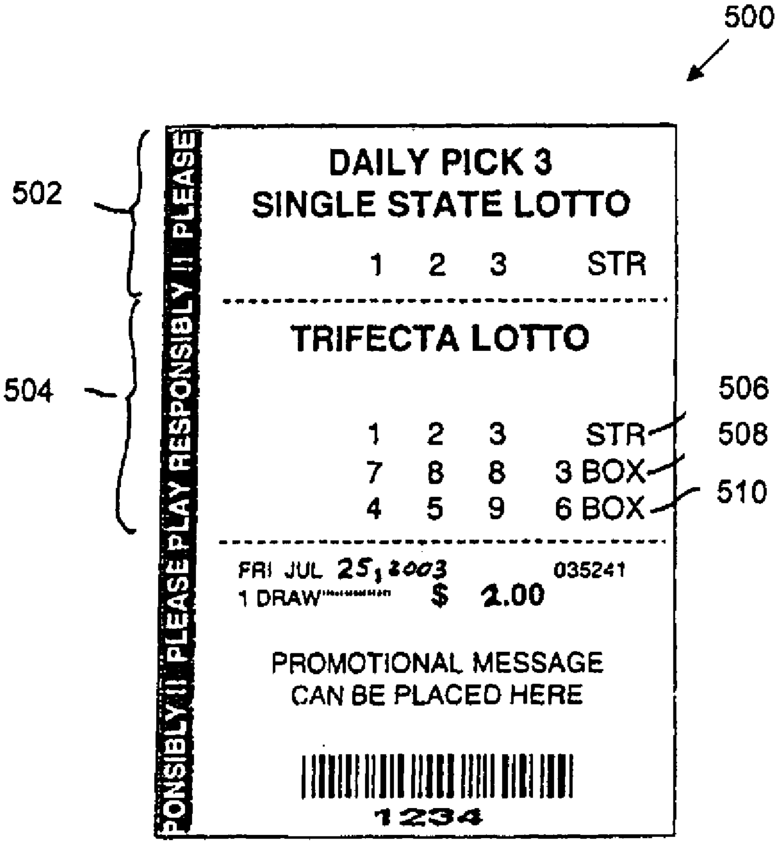
Figure 8:
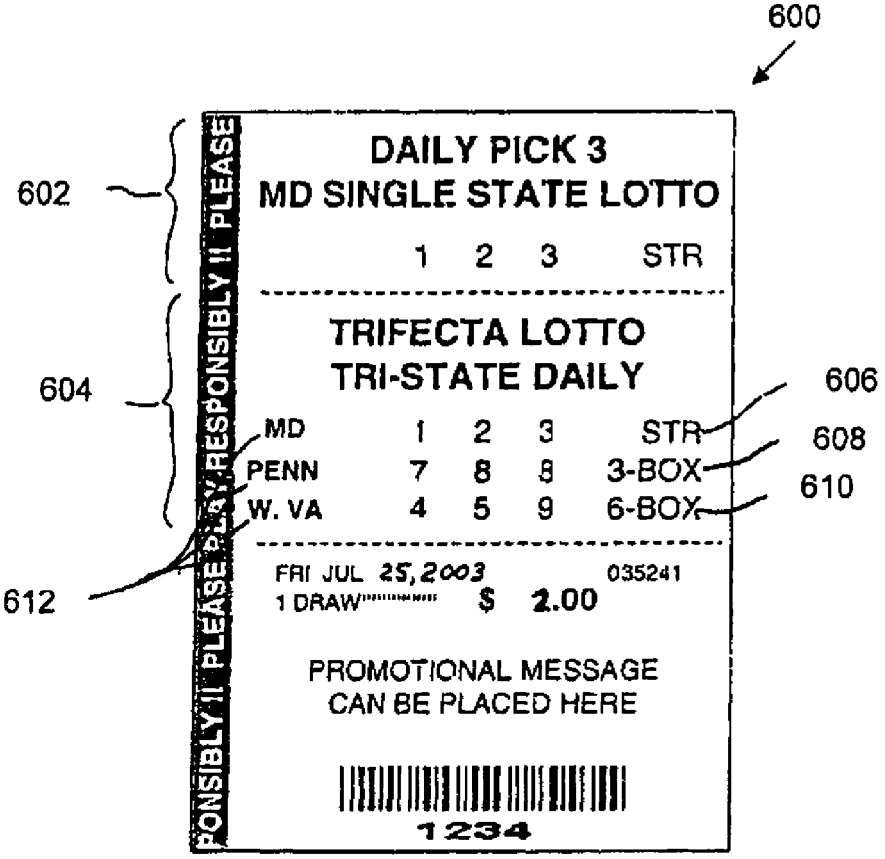

In addition to implementing the extension game in a single lottery jurisdiction as described above, the extension game may be implemented as a multi-state progressive lottery based on the numbers game drawings for several jurisdictions. FIG. 8 illustrates an embodiment of a lottery ticket 600 having indicia for a normal numbers game entry 602, and for a multi-state extension game entry 604. The multi-state extension game may operate in a similar manner as the extension game discussed above, including the use of a plurality numbers 606–610 in the entry 604 for the multi-state extension game. In addition, the lottery ticket 600 may include indicia 612 indicating the states that may be joining to sponsor the multi-state extension game.

In one embodiment, the plurality of numbers 606–610 in the extension game entry 604 may correspond to the number of states sponsoring the extension game, with each number 606–610 corresponding to one of the sponsoring states. For example, the first number 606 may be associated with the numbers game for Maryland, the second number 608 may correspond to the numbers game for Pennsylvania, and the third number 610 may correspond to the numbers game for West Virginia. The same number 606–610 on each extension game entry 604 for the occurrence of an extension game may correspond to the same sponsoring state, or the associations between the sponsoring states and the numbers 606–610 may vary for different extension game entries 604 based on automatic selection at the lottery terminal unit 104, selection by the players when entering the extension game, or by any other method for associating the sponsoring states with particular ones of the number 606–610. By using multiple sponsoring states, the drawing numbers for each states numbers game may be compared to the corresponding number 606–610 to determine whether a match has occurred on the extension game entry 604. In this way, the multi-state extension game may be conducted without the necessity of conducting additional number drawing as discussed above for the single state extension game. After all the states complete their drawings for the occurrence of the numbers game corresponding to the extension game, host computers 134 in each state, or a central host computer 134 managing the multi-state extension game, may compare the drawn numbers to the numbers of each entry 604 in a manner discussed above.

Although the present invention has so far been discussed primarily in terms assuming an extension game played along with Pick 3 games occurring in three different jurisdictions, the present invention may also be configured to be played in any number of jurisdictions, and with other types of numbers games. However, the extension game entries may consist of fewer numbers than the number of jurisdictions in which the extension game is played. For example, if the present invention is played in four jurisdictions, players, or the lottery terminal units 104 if a quick pick is used, may select three jurisdictions in which to play the game. For example, if the jurisdictions are in West Virginia, Maryland, Pennsylvania, and Delaware, a player could pick three out of the four jurisdictions in which he wanted to play the extension game. In this case, a single progressive jackpot funded by all the participating jurisdictions may be awarded or, alternatively, the progressive jackpot may be determined based on the contributions of jurisdictions selected by the player or by the lottery terminal unit 104 for that particular entry.

What is claimed is:

1. A method for providing a lottery game for a plurality of players, comprising:

accepting an entry from each of the plurality of players for an occurrence of the lottery game, each entry comprising a predetermined number of multi-digit entry numbers;

determining an outcome for the occurrence of the lottery game, the outcome for the occurrence of the lottery game comprising selecting a predetermined number of multi-digit drawing numbers, wherein each of the multi-digit drawing numbers being independently determined by different lottery game jurisdictions selected by a player;

comparing the multi-digit entry numbers for each entry to the multi-digit drawing numbers for the occurrence of the lottery game; and determining whether each entry is a winning entry based on the level of correspondence between entry numbers and the drawing numbers.

2. A method for providing a lottery game for a plurality of players according to claim 1, wherein the predetermined number of entry numbers is three entry numbers.

3. A method for providing a lottery game for a plurality of players according to claim 2, wherein each of the multi-digit entry numbers comprises three digits, wherein for each entry a first entry number must have one repeated digit, a second entry number must have no repeated digits, and a third entry number must not be a permutation of the digits of either the first entry number or the second entry number, wherein the predetermined number of multi-digit drawing numbers is three drawing numbers and each of the multi-digit drawing numbers comprises three digits, the method comprising:

comparing the digits in the first entry number of each entry to the digits of at least one of the drawing numbers regardless of the order of the digits;

comparing the digits in the second entry number of each entry to the digits of at least one of the drawing numbers regardless of the order of the digits; and comparing the order of the digits of the third entry number of each entry to the order of the digits of at least of the drawing numbers.

4. A method for providing a lottery game for a plurality of players according to claim 3, comprising determining that an entry is a winning entry where the digits of the first multi-digit entry number matches the digits of at least one multi-digit drawing number regardless of the order of the digits or the digits of the second multi-digit entry number matches the digits of at least one multi-digit drawing number regardless of the order of the digits or the digits of the third entry number matches the order of the digits of at least one multi-digit drawing number.

5. A method for providing a lottery game for a plurality of players according to claim 3, wherein the lottery game is sponsored by a plurality of states, further comprising:

determining the first drawing number in a first state;

determining the second drawing number in a second state; and determining the third drawing number in a third state.

6. A method for providing a lottery game for a plurality of players according to claim 3, comprising:

offering players a progressive jackpot prize; and determining that an entry is a jackpot-winning entry where the digits of the first multi-digit entry number match the digits of at least one multi-digit drawing number regardless of the order of the digits and the digits of the second multi-digit entry number match the digits of at least one multi-digit drawing number regardless of the order of the digits and the digits of the third entry number match the order of the digits of at least one multi-digit drawing number.

7. A method for providing a lottery game for a plurality of players according to claim 3, comprising:

comparing the digits in the first entry number of each entry to the digits of a first drawing number regardless of the order of the digits;

comparing the digits in the second entry number of each entry to the digits of a second drawing number regardless of the order of the digits; and comparing the order of the digits of the third entry number of each entry to the order of the digits of a third drawing number.

8. A method for providing a lottery game for a plurality of players according to claim 7, comprising determining that an entry is a winning entry where the digits of the first multi-digit entry number matches the digits of the first multi-digit drawing number regardless of the order of the digits or the digits of the second multi-digit entry numbers matches the digits of the second multi-digit drawing number regardless of the order of the digits or the digits of the third entry number matches the order of the digits of the third multi-digit drawing number.

9. A method for providing a lottery game for a plurality of players according to claim 7, comprising:

offering players a progressive jackpot prize; and determining that an entry is a jackpot-winning entry where the digits of the first multi-digit entry number match the digits of the first multi-digit drawing number regardless of the order of the digits and the digits of the second multi-digit entry numbers match the digits of the second multi-digit drawing number regardless of the order of the digits and the digits of the third entry number match the order of the digits of the third multi-digit drawing number.

10. A method for providing a lottery game for a plurality of players according to claim 1, wherein each of the multi-digit entry numbers comprises three digits.

11. A method for providing a lottery game for a plurality of players according to claim 1, wherein each of the multi-digit entry numbers comprises four digits.

12. A method for providing a lottery game for a plurality of players according to claim 1, wherein at least one of the multi-digit entry numbers comprises a different number of digits than the other multi-digit entry numbers.

13. A method for providing a lottery game for a plurality of players according to claim 1, comprising allowing each player to specify a comparison type for each multi-digit number, wherein the comparison type is one of comparing an order of the digits in the multi-digit entry number to an order of the digits in a multi-digit drawing number to which the multi-digit entry number is compared, and comparing the digits in the multi-digit entry number to the digits in the multi-digit drawing number regardless of the order of the digits.

14. A method for providing a lottery game for a plurality of players according to claim 13, comprising comparing a multi digit entry number to at least one of the multi-digit drawing numbers based on the comparison type for the multi-digit entry number.

15. A method for providing a lottery game for a plurality of players according to claim 1, wherein the predetermined number of multi-digit entry numbers is equal to the predetermined number of multi-digit drawing numbers.

16. A method for providing a lottery game for a plurality of players according to claim 1, wherein the number of digits in each multi-digit entry number is equal to the number of digits in each multi-digit drawing number.

17. A method for providing a lottery game for a plurality of players according to claim 1, wherein the lottery game is sponsored by a plurality of states, the method comprising selecting each of the multi-digit drawing numbers in a different state.

18. A method for providing a lottery game for a plurality of players according to claim 1, comprising comparing an order of the digits in a multi-digit entry number to an order of the digits in a multi-digit drawing number to which the multi-digit entry number is compared.

19. A method for providing a lottery game for a plurality of players according to claim 1, comprising comparing the digits in a multi-digit entry number to the digits in the multi-digit drawing number regardless of the order of the digits.

20. A method for providing a lottery game for a plurality of players according to claim 1, comprising comparing each of the multi-digit entry numbers to each of the multi-digit drawing numbers.

21. A method for providing a lottery game for a plurality of players according to claim 1, comprising comparing each of the multi-digit entry numbers to a corresponding one of the multi-digit drawing numbers.

22. A method for providing a lottery game for a plurality of players according to claim 1, comprising determining that an entry is a winning entry where the digits of at least one of the multi-digit entry numbers matches the digits of at least one of the multi-digit drawing numbers regardless of the order of the digits.

23. A method for providing a lottery game for a plurality of players according to claim 1, comprising determining that an entry is a winning entry where the order of the digits of at least one of the multi-digit entry numbers matches the order of the digits of at least one of the multi-digit drawing numbers.

24. A method for providing a lottery game for a plurality of players according to claim 1, comprising determining that an entry is a winning entry where the digits of each of the multi-digit entry numbers matches the digits of a corresponding one of the multi-digit drawing numbers regardless of the order of the digits.

25. A method for providing a lottery game for a plurality of players according to claim 1, comprising determining that an entry is a winning entry where the order of the digits of each of the multi-digit entry numbers matches the order of the digits of a corresponding one of the multi-digit drawing numbers.

26. A method for providing a lottery game for a plurality of players, comprising:

accepting an entry from each of the plurality of players for an occurrence of the lottery game, each entry comprising a first multi-digit entry number, a second multi-digit entry number, and a third multi-digit entry number;

determining an outcome for the occurrence of the lottery game, the outcome for the occurrence of the lottery game comprising selecting a first multi-digit drawing number, selecting a second multi-digit drawing number, and selecting a third multi-digit drawing number wherein the number of digits in each multi-digit drawing number is equal to the number of digits in each multi-digit entry number and each of the multi-digit drawing numbers being independently determined by different lottery game jurisdictions selected by a player;

comparing the first multi-digit entry number to the first multi-digit drawing number, the second multi-digit entry number to the second multi-digit drawing number, and the third multi-digit entry number to the third multi-digit drawing number for the occurrence of the lottery game; and determining whether each entry is a winning entry based on the level of correspondence between the first multi-digit entry number and the first multi-digit drawing number, the second multi-digit entry number and the second multi-digit drawing number, and the third multi-digit entry number and the third multi-digit drawing number.

27. A method for providing a lottery game for a plurality of players according to claim 26, wherein the first, second and third multi-digit entry numbers and the first, second and third multi-digit drawing numbers are each three-digit numbers.

28. A method for providing a lottery game for a plurality of players according to claim 27, wherein for each entry the first entry number must have one repeated digit, the second entry number must have no repeated digits, and the third entry number must not be a permutation of the digits of either the first entry number or the second entry number, the method comprising:

comparing the digits in the first entry number of each entry to the digits of the first drawing number regardless of the order of the digits;

comparing the digits in the second entry number of each entry to the digits of the second drawing number regardless of the order of the digits; and comparing the order of the digits of the third entry number of each entry to the order of the digits of the third drawing number.

29. A method for providing a lottery game for a plurality of players according to claim 26, wherein the first, second and third multi-digit entry numbers and the first, second and third multi-digit drawing numbers are each four-digit numbers.

30. A method for providing a lottery game for a plurality of players according to claim 26, comprising allowing each player to specify a comparison type for each of the first, second and third entry numbers, wherein the comparison type is one of comparing an order of the digits in the entry number to an order of the digits in a corresponding drawing number to which the entry number is compared, and comparing the digits in the entry number to the digits in the drawing number to which the entry number is compared regardless of the order of the digits.

31. A method for providing a lottery game for a plurality of players according to claim 26, wherein the lottery game is sponsored by a plurality of states, further comprising:

determining the first drawing number in a first state;

determining the second drawing number in a second state; and determining the third drawing number in a third state.

* * * * *

UNITED STATES PATENT AND TRADEMARK OFFICE

CERTIFICATE OF CORRECTION

PATENT NO. : 7,186,180 B2
APPLICATION NO. : 10/668891
DATED : March 6, 2007
INVENTOR(S) : Lanthrop et al.

It is certified that error appears in the above-identified patent and that said Letters Patent is hereby corrected as shown below:

Delete Drawing sheets 1-7, and substitute therefor the Drawing sheets, consisting of Figs. 1-8, as shown on the attached pages.

Signed and Sealed this

Fourteenth Day of October, 2008

JON W. DUDAS
*Director of the United States Patent and Trademark Office*

UNITED STATES PATENT AND TRADEMARK OFFICE

CERTIFICATE OF CORRECTION

PATENT NO. : 7,186,180 B2
APPLICATION NO. : 10/668891
DATED : March 6, 2007
INVENTOR(S) : Lanthrop et al.

It is certified that error appears in the above-identified patent and that said Letters Patent is hereby corrected as shown below:

Delete the Title Page and substitute therefor the attached Title Page.

Delete Drawing sheets 1-7, and substitute therefor the Drawing sheets, consisting of Figs. 1-8, as shown on the attached pages.

This certificate supersedes the Certificate of Correction issued October 14, 2008.

Signed and Sealed this

Fourth Day of November, 2008

JON W. DUDAS
*Director of the United States Patent and Trademark Office*

(12) United States Patent
Lathrop et al.

(10) Patent No.: US 7,186,180 B2
(45) Date of Patent: Mar. 6, 2007

(54) LOTTERY GAME WITH METHOD FOR PLAYING A LOTTERY GAME USING MULTIPLE INDEPENDENT LOTTERY RESULTS

(75) Inventors: Kenneth Lathrop, Kinnelon, NJ (US); Stephen Penrice, Morristown, NJ (US)

(73) Assignee: Scientific Games Royalty Corporation, Newark, DE (US)

( * ) Notice: Subject to any disclaimer, the term of this patent is extended or adjusted under 35 U.S.C. 154(b) by 386 days.

(21) Appl. No.: 10/668,891

(22) Filed: Sep. 23, 2003
(Under 37 CFR 1.47)

(65) Prior Publication Data

US 2005/0064931 A1 Mar. 24, 2005

(51) Int. Cl.
*G06F 17/00* (2006.01)
*G06F 19/00* (2006.01)

(52) U.S. Cl. .................................... 463/17; 463/19

(58) Field of Classification Search ............ 379/93.13; 463/17, 283, 1; 273/139; 283/72
See application file for complete search history.

(56) References Cited

U.S. PATENT DOCUMENTS

| | | | | | |
|---|---|---|---|---|---|
| 4,273,335 | A | * | 6/1981 | Allonsius | 273/144 B |
| 5,106,089 | A | * | 4/1992 | Wood | 273/139 |
| 5,112,050 | A | * | 5/1992 | Koza et al. | 463/17 |
| 5,116,049 | A | * | 5/1992 | Sludikoff et al. | 273/139 |
| 5,186,463 | A | * | 2/1993 | Marin et al. | 463/27 |
| 5,232,221 | A | * | 8/1993 | Sludikoff et al. | 273/139 |
| 5,273,281 | A | * | 12/1993 | Lovell | 273/138.1 |
| 5,851,010 | A | * | 12/1998 | Feinberg | 273/274 |
| 6,406,019 | B1 | * | 6/2002 | Joyner et al. | 273/138.1 |
| 6,416,408 | B2 | * | 7/2002 | Tracy et al. | 463/16 |
| 6,592,454 | B2 | * | 7/2003 | Libby et al. | 463/6 |
| 6,702,668 | B2 | * | 3/2004 | Banyai | 463/17 |
| 6,783,456 | B2 | * | 8/2004 | White | 463/18 |
| 6,830,514 | B2 | * | 12/2004 | Meyer et al. | 463/17 |
| 2003/0134672 | A1 | * | 7/2003 | Fulton | 463/17 |
| 2004/0102239 | A1 | * | 5/2004 | Samila | 463/17 |
| 2005/0003884 | A1 | * | 1/2005 | Meyer et al. | 463/17 |
| 2005/0064930 | A1 | * | 3/2005 | Jubinville et al. | 463/17 |
| 2005/0181858 | A1 | * | 8/2005 | Caro et al. | 463/17 |

OTHER PUBLICATIONS

John Scarne, Scarne's New Complete Guide To Gambling 1974, Simon and Schuster.*
Illinois State Lottery*

* cited by examiner

*Primary Examiner*—Corbett B. Coburn
*Assistant Examiner*—Sunit Pandya
(74) *Attorney, Agent, or Firm*—Carlton Fields P.A.

(57) ABSTRACT

In one aspect, the invention is directed to a method for providing a lottery game for a plurality of players. The method may include accepting an entry from each of the plurality of players for an occurrence of the lottery game, and each entry may include a predetermined number of multi-digit entry numbers. The method may further include determining an outcome for the occurrence of the lottery game, and the outcome for the occurrence of the lottery game may include selecting a predetermined number of multi-digit drawing numbers. Still further, the method may include comparing the multi-digit entry numbers for each entry to the multi-digit drawing numbers for the occurrence of the lottery game, and determining whether each entry is a winning entry based on the level of correspondence between entry numbers and the drawing numbers.

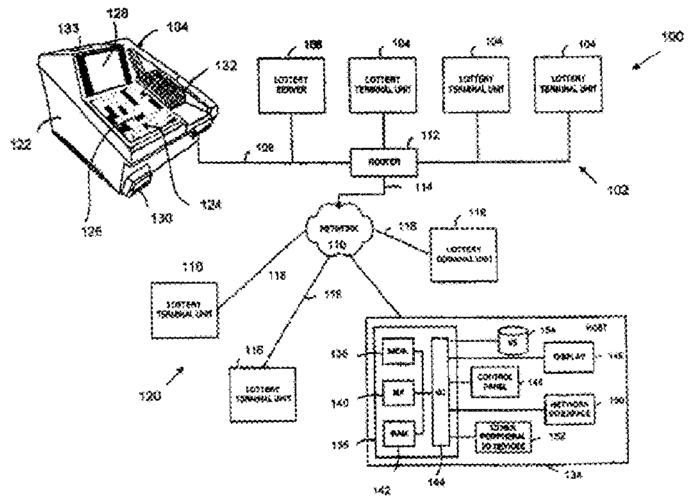

31 Claims, 7 Drawing Sheets